(12) United States Patent
Li et al.

(10) Patent No.: US 6,392,756 B1
(45) Date of Patent: May 21, 2002

(54) METHOD AND APPARATUS FOR OPTICALLY DETERMINING PHYSICAL PARAMETERS OF THIN FILMS DEPOSITED ON A COMPLEX SUBSTRATE

(75) Inventors: Guoguang Li; Hongwei Zhu, both of San Jose; Dale A. Harrison, Tracy; Abdul Rahim Forouhi, Cupertino; Weilu Xu, San Jose, all of CA (US)

(73) Assignee: N&K Technology, Inc., Santa Clara, CA (US)

( * ) Notice: Subject to any disclaimer, the term of this patent is extended or adjusted under 35 U.S.C. 154(b) by 0 days.

(21) Appl. No.: 09/336,404

(22) Filed: Jun. 18, 1999

(51) Int. Cl.⁷ .................................................. G01B 11/06
(52) U.S. Cl. ........................ 356/632; 356/504; 356/369
(58) Field of Search ................................. 356/630, 632, 356/369, 503, 504

(56) References Cited

U.S. PATENT DOCUMENTS

| | | | |
|---|---|---|---|
| 3,601,492 A | 8/1971 | Reichard ..................... 356/108 |
| 3,892,490 A | * 7/1975 | Uetsuki et al. ............. 356/632 |
| 4,355,903 A | 10/1982 | Sandercock ................. 356/382 |
| 4,555,767 A | 11/1985 | Case et al. .................. 364/563 |
| 4,676,647 A | 6/1987 | Kikkawa et al. ............ 356/382 |
| 4,707,611 A | * 11/1987 | Southwell .................... 356/632 |
| 4,885,709 A | 12/1989 | Edgar et al. ................. 364/563 |
| 4,899,055 A | 2/1990 | Adams ........................ 250/372 |
| 4,905,170 A | * 2/1990 | Forouhi et al. .............. 356/631 |
| 4,984,894 A | * 1/1991 | Kondo ......................... 356/632 |
| 4,999,509 A | 3/1991 | Wada et al. ................. 250/560 |
| 5,042,949 A | 8/1991 | Greenberg et al. .......... 356/345 |
| 5,101,111 A | 3/1992 | Kondo ......................... 250/560 |
| 5,241,366 A | 8/1993 | Bevis et al. ................. 356/382 |
| 5,311,284 A | 5/1994 | Nishino ....................... 356/364 |
| 5,337,150 A | 8/1994 | Mumola ...................... 356/382 |
| 5,365,340 A | 11/1994 | Ledger ........................ 356/357 |
| 5,371,596 A | 12/1994 | Hattori et al. ............... 356/355 |
| 5,396,080 A | 3/1995 | Hannotiau et al. .......... 250/560 |
| 5,457,534 A | 10/1995 | Lacey et al. ................. 356/357 |
| 5,471,303 A | 11/1995 | Ai et al. ...................... 356/357 |
| 5,486,701 A | 1/1996 | Norton et al. ............... 250/372 |
| 5,493,401 A | * 2/1996 | Horie et al. ................. 356/632 |
| 5,523,840 A | 6/1996 | Nishizawa et al. .......... 356/355 |
| 5,555,472 A | 9/1996 | Clapis et al. ................ 356/357 |
| 5,604,581 A | * 2/1997 | Liu et al. ..................... 356/632 |
| 5,747,813 A | 5/1998 | Norton et al. ............... 250/372 |
| 5,784,167 A | * 7/1998 | Ho .............................. 356/369 |
| 5,883,720 A | * 3/1999 | Akiyama et al. ............ 356/632 |
| 5,999,267 A | * 12/1999 | Zawaideh .................... 356/630 |

OTHER PUBLICATIONS

Li, G. et al., A fast, easy way to measure the thickness of DLC films, Data Storage, pp. 29–32, Jun. 1999.

* cited by examiner

Primary Examiner—Richard A. Rosenberger
(74) Attorney, Agent, or Firm—Lumen Intellectual Property Services, Inc.

(57) ABSTRACT

A method and an apparatus for optically determining a physical parameter such as thickness t, index of refraction n, extinction coefficient k or a related physical parameter such as energy bandgap $E_g$ of a thin film. A test beam having a wavelength range $\Delta\lambda$ is used to illuminate the thin film after it is deposited on a complex substrate which has at least two layers and exhibits a non-monotonic and an appreciably variable substrate optical response over wavelength range $\Delta\lambda$. Alternatively, the thin film can be deposited between the at least two layers of the complex substrate. A measurement of a total optical response, consisting of the substrate optical response and an optical response difference due to the thin film is performed over wavelength range $\Delta\lambda$. The at least two layers making up the complex substrate are chosen such that the effect of multiple internal reflections in the complex substrate and the film is maximized. The physical parameters are determined from the total optical response which can be in the form of a reflected and/or a transmitted beam.

56 Claims, 12 Drawing Sheets

METHOD AND APPARATUS FOR OPTICALLY DETERMINING PHYSICAL PARAMETERS OF THIN FILMS DEPOSITED ON A COMPLEX SUBSTRATE

FIELD OF THE INVENTION

This invention relates generally to methods and apparatus for optically determining physical parameters of thin films deposited on a complex substrate, and in particular to measurements of thin films on complex substrates for obtaining physical parameters such as thickness t, refraction index n and extinction coefficient k.

BACKGROUND OF THE INVENTION

The determination of physical parameters of thin films is very important, since many modern technologies rely on thin films for various functions. For example, thin films are used for optical and/or mechanical protection of surfaces, alteration of surface optical and/or mechanical properties and for many other purposes. For example, in the manufacture of magnetic hard disks thin films exhibiting high hardness and high wearing resistance (e.g., diamond-like-carbon (DLC)) are used to protect the disk surface.

The most commonly investigated physical parameters of thin films include their thickness t, index of refraction n, extinction coefficient k, surface roughness σ (at the interface between the thin film and the substrate on which it is deposited) and energy bandgap $E_g$ which is related to extinction coefficient k. Knowledge of parameters t, n and k tends to be most important in practical applications. In particular, the thickness t of the thin film is frequently crucial and has to be known to a very high degree of accuracy. This presents considerable difficulty, since t for thin films typically ranges from 1,000 Angstroms down to tens of Angstroms and less. In this range, typical optical measurements are not very reliable.

Various prior art techniques exist for examining thin films. U.S. Pat. No. 3,601,492 to Reichert employs a standard interference technique for measuring film thickness based on observing the interference between the light reflected from the top and bottom surfaces of the thin film. Greenberg et al. teaches in U.S. Pat. No. 5,042,949 that film thickness can be determined by examining the interference pattern and reflectance data from a reflectance pattern, respectively to determine film thickness profile. In U.S. Pat. No. 4,999,509 Wada et al. describe a how to measure thicknesses of several films using a reflectance measuring device.

Still another approach to determining thin film thickness is taught by Hattori et al. in U.S. Pat. No. 5,371,596. In accordance with this technique the light from a light source is modulated to produce a modulated interference light. This modulated light is reflected from the thin film and used by a number of photodetectors to derive film thickness.

Ellipsometry is another technique used to measure physical parameters of thin films. In this method n and k are determined by measuring the change in the state of polarization of the reflected light. Ellipsometry requires complex instrumentation and needs certain sophistication in interpretation of the measurements.

Unfortunately, the above prior art approaches yield less and less satisfactory results for the thin film parameters with decreasing film thickness due to poor signal-to-noise ratios.

To overcome these limitations, several prior art techniques rely on comparisons of reflectance data obtained from thin films and monitoring samples. For example, Sandercock teaches in U.S. Pat. No. 4,355,903 to compare the reflection of polychromatic light from a reference or standard thin film with the reflection obtained from a film of unknown thickness. Mumola teaches in U.S. Pat. No. 5,337,150 the use of a separate reference wafer which has a thin film layer similar to that being coated on the actual wafer. A broadband beam of radiation illuminates the sample wafer and yields a reflected beam having a unique spectral radiation (spectral signature). Film thickness is identified when the spectral pattern of this reflected beam matches that of the beam reflected from the reference wafer. Similarly, U.S. Pat. No. 5,101,111 to Kondo teaches a method of measuring film thickness using a reflectance sample having a known reflectance for each value of film thickness dx. The reflectances for the various thicknesses are stored in a table and compared to those obtained when examining a sample.

In U.S. Pat. No. 4,555,767 Case et al. disclose a technique and apparatus for measuring the thickness of epitaxial layers by infrared reflectance. The technique relies on taking the Fourier transform of the signal reflected from the epi layer using a Fourier transform IR spectrometer and comparing the result with theoretical values obtained beforehand. In U.S. Pat. No. 5,523,840 Nishizawa et al. also rely on a Fourier transformation to obtain an interference waveform dispersion spectrum which is compared with a waveform obtained by numerical calculation using an optical characteristic matrix. Waveform fitting between theoretical and measured spectra is used to obtain film thickness. U.S. Pat. No. 5,241,366 to Bevis et al. discloses a thin film thickness monitor which performs the measurement based on a comparison between the reflection of polychromatic light from a reference thin film and the sample thin film. U.S. Pat. No. 5,365,340 to Clapis et al. and U.S. Pat. No. 5,555,472 to Ledger also teach how to measure film thicknesses based on reference samples yielding reference reflectance signals.

All of the above optical approaches to measuring thin film thickness and any other physical parameters of the thin film are complicated and not capable of providing the desired levels of accuracy. In particular, the above techniques can not be used for measuring thin films in thickness ranges of tens of Angstroms with an accuracy of less than 5 Angstroms. Moreover, none of these methods can determine the n, k and t values of a thin film simultaneously.

The prior art also teaches non-optical methods of determining thin film thicknesses. For example, atomic force microscopy (AFM) employing a deflectable stylus can be used to determine film thicknesses by surface profiling. The drawbacks of this technique are that it requires a physical step which is destructive to the thin film or degrades its surface. In addition, this technique can not be used to determine other physical parameters of the thin film, such as the n, k and $E_g$ values.

In U.S. Pat. No. 4,905,170 Forouhi et al. describe an optical method for determining the physical parameters of a thin film in amorphous semiconductors and dielectrics. This technique is very accurate and it takes into account the quantum mechanical nature of the light and thin film interaction. Unfortunately, it can not generate sufficiently accurate thickness readings and simultaneously determine n and k values for thin films deposited on substrates having a relatively "smooth" reflectance spectrum. Such substrates are very commonly used, however, and include many typical substrate materials, e.g., Si, quartz, Mg, Cr and Ni and AlTiC alloys used in the semiconductor and magnetic storage technologies as well as polycarbonate (PC) used in optical disks.

Hence, there is a pressing need to develop an approach which will enable one to measure the thickness as well as other physical properties of thin films on various substrates to a high degree of accuracy. Specifically, it would be very desirable to provide a non-destructive measurement method for determining film thickness to an accuracy of 5 to 2 Angstroms or less in films whose thickness is less than 100 Angstroms or even less than 10 Angstroms. Furthermore, the method should be capable of identifying additional physical parameters of the thin film such as the values of n, k and $E_g$.

OBJECTS AND ADVANTAGES OF THE INVENTION

Accordingly, it is a primary object of the present invention to provide a method and an apparatus for optically determining physical parameters of thin films. In particular, the apparatus and method should enable one to determine film thickness t to within 5 Angstroms and yield accurate values of physical parameters including n, k and $E_g$.

It is another object of the invention to enable one to evaluate the above physical parameters of thin films in a non-destructive manner.

Yet another object of the invention is to provide for the apparatus of the invention to be simple and cost-effective to implement. Additionally, the method of the invention should be easy to employ in practical situations.

The above objects and advantages, as well as numerous improvements attained by the apparatus and method of the invention are pointed out below.

SUMMARY

These objects and advantages are secured by a method for optically determining a physical parameter including thickness t, index of refraction n and extinction coefficient k of a thin film. The method can also be used to determine related physical parameters, such as energy bandgap $E_g$ related to the extinction coefficient k of the material of the thin film. The method calls for providing a test beam having a wavelength range $\Delta\lambda$ and providing a complex substrate which has at least two layers and exhibits a non-monotonic and an appreciably variable substrate optical response over wavelength range $\Delta\lambda$. The thin film is deposited on the complex substrate. A measurement of a total optical response, consisting of the substrate optical response and an optical response difference due to the thin film is performed over wavelength range $\Delta\lambda$. The physical parameters are then determined from the total optical response.

In one case the substrate optical response is a substrate reflectance and the total optical response is a total reflectance due to the reflectance of the substrate and a reflectance difference due to the presence of the thin film. Thus, illumination with the test beam produces a reflected beam.

The reflected beam can be analyzed to determine the physical parameter from any one or from any combination of the properties of light making up the reflected beam. These properties include phase, amplitude, s-polarization, p-polarization, s-polarization amplitude, p-polarization amplitude, s-polarization phase and p-polarization phase. In a particular case, the reflectance measurement can involve an ellipsometric technique.

When the optical response examined is reflectance, the step of determining the physical parameters is based on a model of n and k of the substrate and thin film. In the preferred embodiment the Forouhi-Bloomer method is used for modeling n and k. Other dispersion models can also be used. In some cases, no dispersion model is necessary. The model yields a theoretical total reflectance value $R_{T(th)}$ and this theoretical value is compared to the total reflectance $R_T$ obtained during the measurement. The comparison of these values is performed and the parameters of the model are adjusted to conform with the observed value. The values of the physical parameters are then obtained from the model. The fitting of the theoretical and measured values can be performed by a fitting technique such as non-linear least squares fit, a mean absolute difference fit or any other suitable technique.

The physical parameters can also be determined based on optical transmittance. In this case the optical response is a substrate transmittance and the total optical response is a total transmittance due to the transmittance of the substrate and a transmittance difference due to the presence of the thin film.

Illumination with the test beam produces a transmitted beam. The transmitted beam can be analyzed to determine the physical parameter from any one or from any combination of the properties of light making up the transmitted beam. As in the case of the reflected beam, the properties of the transmitted beam which can be examined include phase, amplitude, s-polarization, p-polarization, s-polarization amplitude, p-polarization amplitude, s-polarization phase and p-polarization phase. In a particular case, the transmittance can be analyzed by an ellipsometric technique.

The step of determining the physical parameter from the transmitted beam can be based on transmittance model of the substrate and thin film. The model yields a theoretical total transmittance value $T_{T(th)}$ and this theoretical value is compared to the total transmittance $T_T$ obtained during the measurement. As in the reflective approach, the value of the physical parameters is obtained from the model. A fitting technique such as non-linear least squares fit, a mean absolute difference fit or any other suitable technique can be employed as well. In the preferred embodiment the Forouhi-Bloomer method is used for modeling transmittance. Other dispersion models can also be used. In some cases, no dispersion model is necessary.

The complex substrate is selected to have a non-zero, non-monotonic and appreciably variable substrate optical response over wavelength range $\Delta\lambda$. This can be achieved when the at least two layers making up the complex substrate are chosen such that the effect of multiple internal reflections in the complex substrate and the film is maximized.

An apparatus for optically determining the physical parameters of the thin film employs the complex substrate which is made up of at least two layers and has the above-mentioned substrate optical response characteristics over wavelength range $\Delta\lambda$. The apparatus has a light source for illuminating the complex substrate and the thin film deposited on it with a test beam spanning the wavelength range $\Delta\lambda$. A detector is provided for measuring the total optical response, e.g., a reflected beam and/or a transmitted beam. A computing unit in communication with the detector determines the physical parameter from the total optical response.

The material composition of each of the layers is selected such that optical response difference is non-zero, non-monotonic and appreciably variable over $\Delta\lambda$. For example, the materials are $SiO_2$, Si or $SiO_xN_y$. These materials and their thicknesses are selected to maximize the effect of multiple internal reflections in the complex substrate and the thin film. The apparatus can be adapted for making measurements of transmittance and/or reflectance of the complex substrate and the thin film. The physical parameters are determined by the computing unit which obtains its data from the detector set up to detect the transmitted or reflected beam.

A polarizer can be provided to polarize the test beam. Another polarizer, or analyzer, can be placed in the path of the reflected or transmitted beam. The use of such polarizers or analyzers depends on what kind of light characteristics, i.e., s-polarization or p-polarization or their ratios (ellipsometric techniques), of the reflected or transmitted beams are measured to determine the physical parameters of the thin film.

Furthermore, a monitoring sample for optically monitoring the physical parameter of a thin film in accordance with the invention can be used in a monitoring system. For example, a deposition chamber for depositing thin films on a substrate can employ a monitoring sample to determine from it the physical parameters of the thin film being deposited on the substrate. Of course, the monitoring sample can be measured in the reflective or transmissive arrangement, as necessary or preferable.

In another embodiment of the invention, the thin film whose physical parameters are to be determined can be deposited between two of the layers making up the complex substrate. In this case the complex substrate is likewise designed to maximize the effect of multiple internal reflections within the substrate and the thin film.

The particulars of the invention and its various embodiments are described in detail in the detailed description section with reference to the attached drawing figures.

DETAILED DESCRIPTION

Theoretical and Prior Art Review

Figure 1:
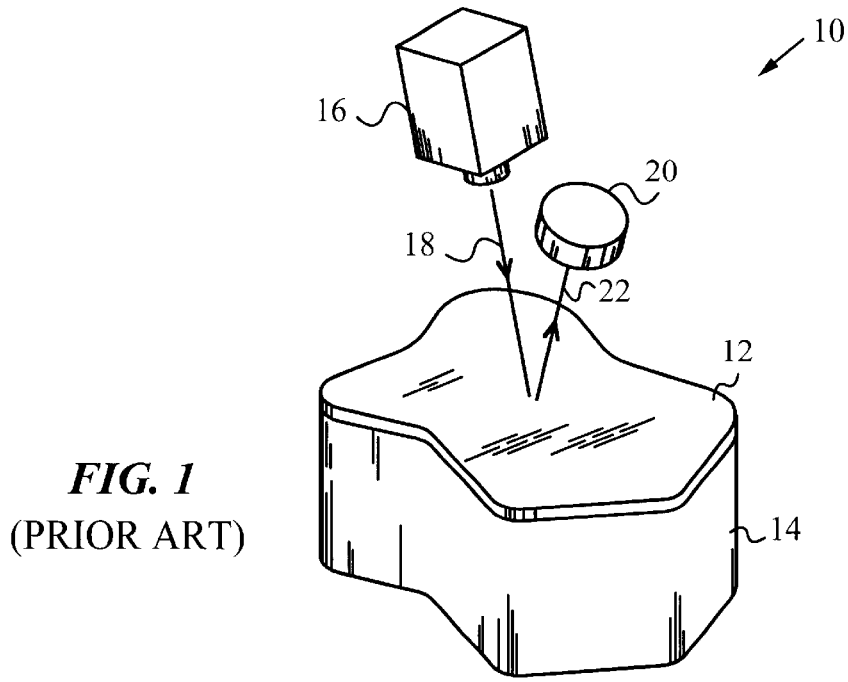
FIG. 1 is an isometric view of a generic prior art reflectance measurement system.

The invention will be best understood after reviewing a typical prior art arrangement 10 for measuring physical properties of a film 12 deposited on a substrate 14 as shown in FIG. 1. Arrangement 10 has a light source 16 for illuminating film 12 with a test beam 18. A detector 20 receives a light beam 22 reflected off film 12 and substrate 14. Typically, the wavelength $\lambda$ of beam 18 is varied over a certain range so that beam 22 can be studied as a function of wavelength $\lambda$.

Figure 2:
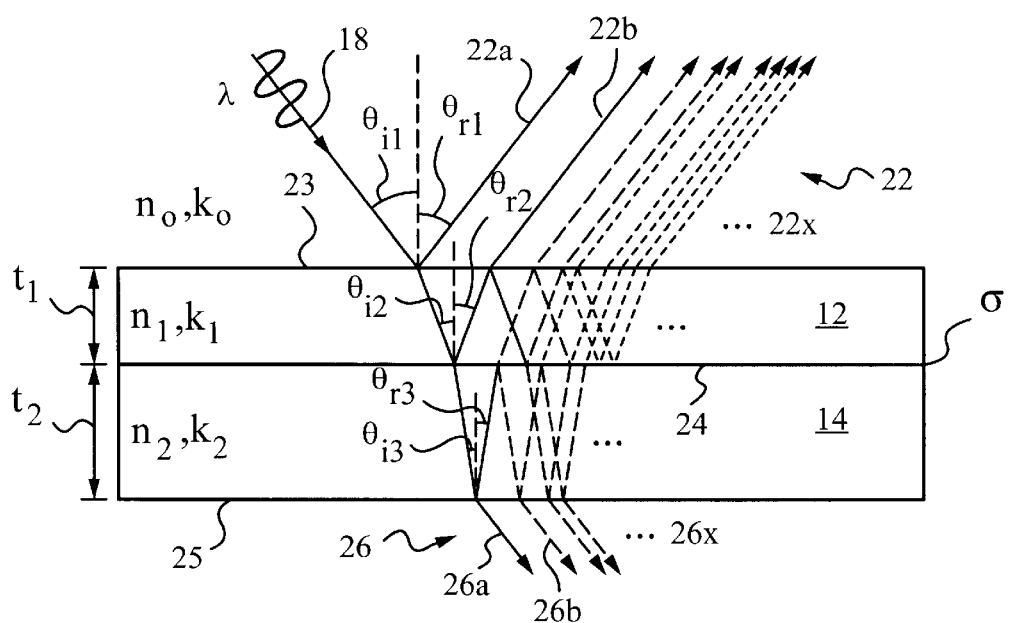
FIG. 2 is a general diagram illustrating the well-known principles of multiple reflection in a two-layer structure.

FIG. 2 shows the propagation of beam 18 inside film 12 and substrate 14. Beam 18 is incident on film 12 at an angle of incidence $\theta_{i1}$. This angle is typically very small; in other words, beam 18 strikes a surface 23 of film 12 at near-normal incidence. A portion 22a of reflected beam 22 is reflected directly from surface 23 at an angle of reflection $\theta_{r1}$ (where $\theta_{i1}=\theta_{r1}$). The remaining portion of beam 18 is transmitted through film 12 and refracted or bent towards the normal in accordance with Snell's law. The light arriving at an interface 24 between substrate 14 and film 12 is thus incident on interface 24 at an angle of incidence $\theta_{i2}$ smaller than angle $\theta_{i1}$. Once again, a portion of the light is reflected at interface 24 at an angle of reflection $\theta_{r2}$ (where $\theta_{i2}=\theta_{r2}$) and a portion is transmitted and refracted. Another reflection and transmittance occur at a surface 25 of substrate 14 where a portion of the light incident at $\theta_{i3}$ is reflected at $\theta_{r3}$ ($\theta_{i3}=\theta_{r3}$) and a portion 26a is transmitted.

In most situations the interference inside substrate 14 is incoherent because coherence is not preserved between internally reflected and transmitted light portions. This is chiefly due to the optical characteristics of substrate 14 and its thickness. For this reason, the numerous reflections and transmittances occurring at surfaces 23, 25 and at interface 24 and for which coherence is not preserved are indicated in dashed lines. Reflected beam 22 is composed of many light portions 22a, 22b, ... 22x which propagate along different paths and undergo various combinations of reflections and transmittances. Among light portions 22a, 22b, ... 22x those which interfere incoherently, i.e., light portions 22c ... 22x, cancel and hence do not contribute to reflected beam 22.

Those light portions which interfere coherently, i.e., light portions 22a, 22b produce a non-zero interference signal and hence contribute to reflected beam 22. The differences in distances traveled or path length differences between portions 22a, 22b introduce relative phase shifts between portions 22a, 22b. The phase shifts cause interference between the individual portions 22a, 22b of reflected beam 22.

It is known in the art that path length differences between various light portions depend on a thickness $t_1$ of film 12, a thickness $t_2$ of substrate 14 and indices or refraction $n_1$, $n_2$ of film 12 and substrate 14 respectively. For example, in a simple model, portions 22a and 22b of beam 22 exhibit a phase shift $\delta=2\pi\Delta/\lambda$ where $\Delta=2nt_1 \cos\theta$ is the path length difference between portions 22a and 22b related to thickness $t_1$, of film 12. The interference produced between portions 22a and 22b is characteristic of this path length difference $\Delta$. When $\lambda$ is known then one can calculate $\Delta$ in terms of $\lambda$ and use the equation to obtain thickness $t_1$.

In practice, the situation is more complicated. Extinction coefficients $k_1$, $k_2$ of film 12 and substrate 14 describe the absorption of light and hence dictate the intensities of the individual light portions. The values $n_1$, $n_2$ and $k_1$, $k_2$ depend on wavelength $\lambda$ of light of beam 18; that is, the values of these coefficients vary as a function of wavelength $\lambda$ ($n=n(\lambda)$ and $k=k(\lambda)$). In fact, for any material $n(\lambda)$ and $k(\lambda)$ represent a "fingerprint" of the material. Furthermore, in many cases there exists a strong correlation between $n(\lambda)$ and $k(\lambda)$ and more tangible physical parameters such as composition or degree of "diamond-like" character, bandgap energy $E_g$, the electrical properties of the material and many other parameters.

There are several models for describing how the physical parameters of film 12 affect the spectrum of beam 22. A particularly useful prior art model is the Forouhi-Bloomer technique described in U.S. Pat. No. 4,905,170 which determines physical parameters of film 12 based on the following equations:

$$k(E) = \sum_{i=1}^{q} \frac{A_i(E-E_g)^2}{E^2+B_iE+C_i},$$

$$n(E) = n(\infty) + \sum_{i=1}^{q} \frac{B_{0i}E+C_{0i}}{E^2+B_iE+C_i}.$$

In these equations E is the photon energy, which is related to wavelength $\lambda$ according to $E=hc/\lambda$, where h is Planck's constant and c is the speed of light in vacuum. $E_g$ is the bandgap energy or the minimum photon energy required for absorption, and A, B and C are parameters directly related to the electronic structure of the material of film 12. The term $n(\infty)$ represents the value of $n(\lambda)$ as $\lambda$ tends toward infinity. The quantities $B_0$ and $C_0$ are not independent parameters but depend on A, B, C and $E_g$. The equation for $n(E)$ is derived from the equation for $k(E)$ through the well-known Kramers-Kronig dispersion relation.

The Forouhi-Bloomer model incorporates the above equations into the Fresnel coefficients, along with a factor that depends on interface roughness $\sigma$, to generate a calculated or theoretical reflectance spectrum, $R_{th}$ of reflected beam 22. The quantity $R_{th}$ is then compared to the experimentally measured reflectance spectrum, R, over a wavelength range $\Delta\lambda$ of light beam 18. This comparison is performed with the aid of a non-linear least-squares fit:

$$\delta = \sqrt{\frac{1}{N}\sum_{i=1}^{N}[R(\lambda_i)-R_{th}(\lambda_i)]^2}.$$

Typically, wavelength range $\Delta\lambda$ is selected from 190 nm to 900 nm in 1 nm intervals; thus, N=711. To obtain the values of the physical parameters of film 12 the quantities involving these physical parameters, specifically thickness $t_1$, roughness $\sigma$, A, B, C, $n(\infty)$ and $E_g$ are varied such that $\delta$ is minimized. This minimization is complete after several iterations. The final parameters then yield the physical parameters including $t_1$, $n(\lambda)$, $k(\lambda)$, $\sigma$ and $E_g$.

Figure 3:
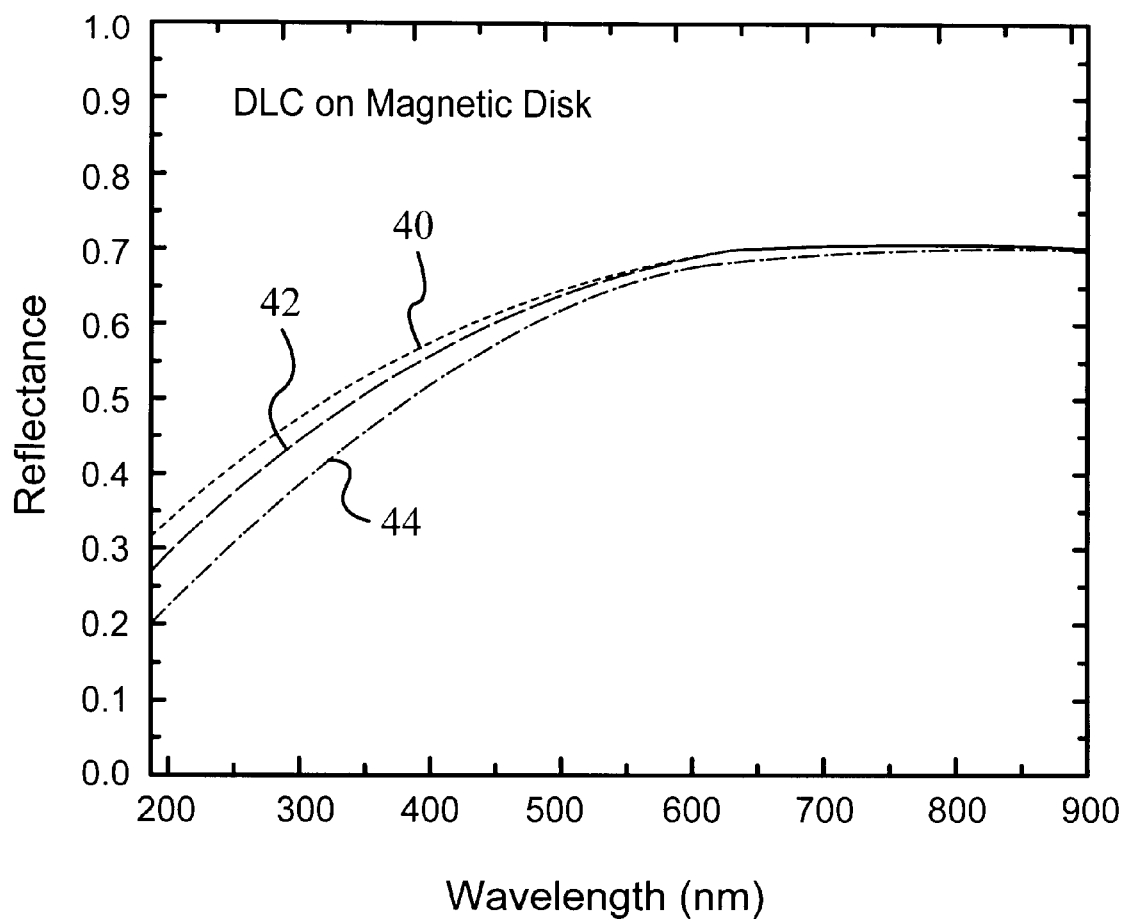
FIG. 3 is a graph showing the reflectance of a thin DLC film on a magnetic substrate measured according to the prior art.

As thickness $t_1$, of film 12 decreases, e.g., to less than 100 Angstroms, and when substrate 14 has a relatively "smooth" reflectance spectrum (i.e., a monotonic and slowly variable reflectance spectrum) over wavelength range $\Delta\lambda$ then the Forouhi-Bloomer technique as well as the other prior art techniques based on reflectance become inaccurate. This is because the response of the substrate and the thin film does not exhibit sufficient variation in the reflected signal to yield good data for model calculations. FIG. 3 illustrates the smooth reflectance spectrum of beam 22 for $\Delta\lambda$ ranging from 190 nm to 900 nm obtained when film 12 is made of diamond-like carbon (DLC) and substrate 14 is a magnetic material (e.g., magnetic disk). Clearly, the spectrum does not vary much for film thicknesses of 49 Angstroms, 65 Angstroms and 92 Angstroms—graphs 40, 42, 44 respectively. Hence, it is not possible to derive accurate values for the physical parameters based on the graphs of FIG. 3.

Of course, a transmittance measurement can be used with or instead of a reflectance measurement when the substrate is not opaque. In other words, arrangement 10 of FIG. 1 can be set up to intercept a transmitted beam 26 as shown in FIG. 2 composed of beam portions 26a, 26b, . . . 26x, which interfere with each other due to path length differences in a manner analogous to that in reflected beam portions 22a, 22b, . . . 22x. Transmitted beam 26 can then be used to determine the physical parameters. Again, any dispersion model, including the Forouhi-Bloomer model can be used to determine the n and k spectra. At small thickness $t_1$, of film 12 these transmittance measurements are once again incapable of delivering accurate values for the physical parameters.

DETAILED DESCRIPTION OF THE EMBODIMENTS

Figure 4:
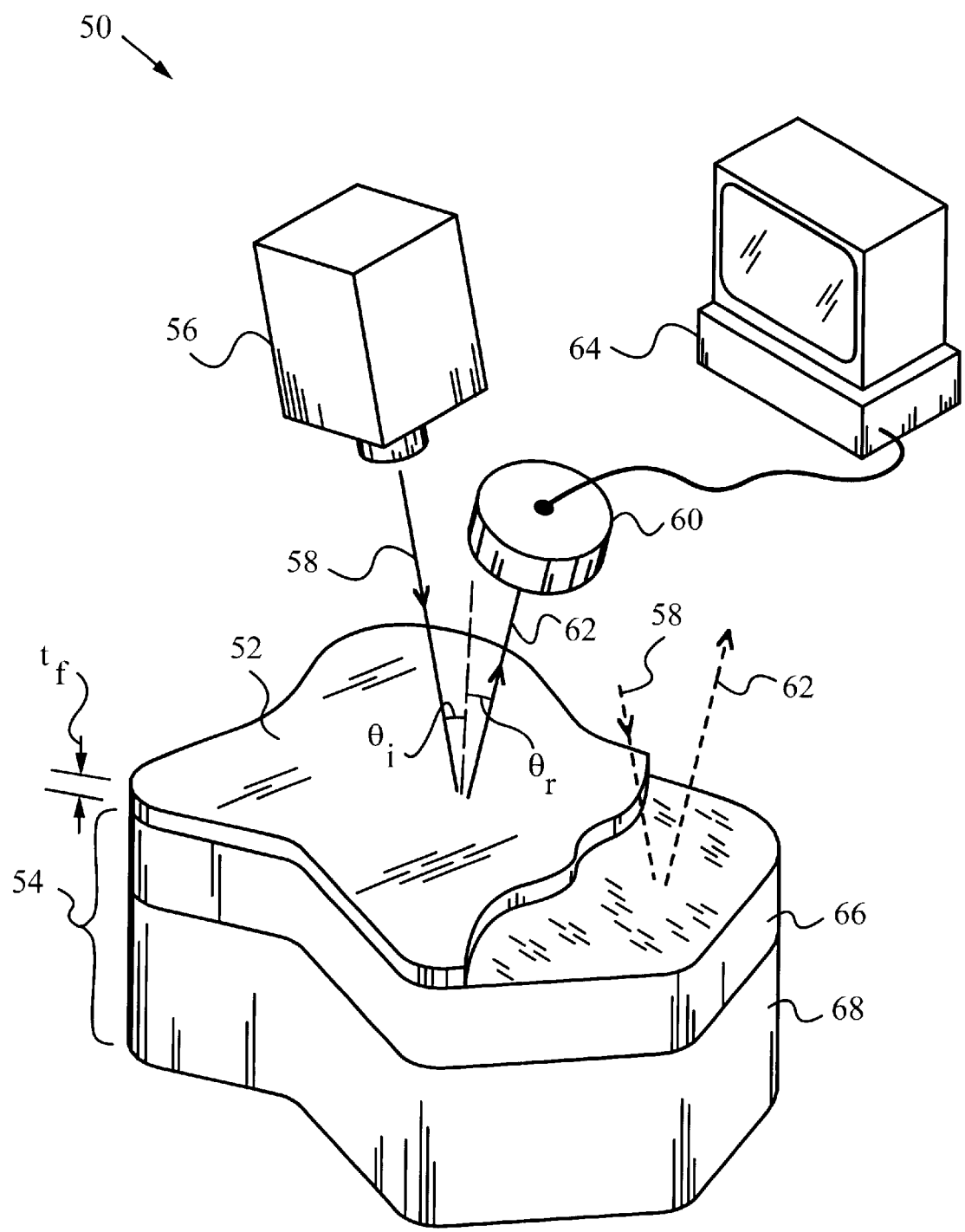
FIG. 4 is an isometric view showing a complex substrate coated with a thin film according to the invention.

FIG. 4 illustrates an apparatus 50 in accordance with the invention for measuring physical parameters of a thin film 52 deposited on a complex substrate 54. Film 52 can have a thickness $t_f$ of less than 100 Angstroms and even less than 10 Angstroms. Apparatus 50 has a light source 56 for delivering a test beam 58. Light source 56 can be a tunable laser or any other suitable light source or combination of light sources for producing stable light spanning a wavelength range $\Delta\lambda$, e.g., from 190 nm to 900 nm. Light source 56 is oriented such that beam 58 illuminates or is incident on complex substrate 54 and film 52 at a near-normal incidence. In principle, however, angle of incidence $\theta_i$ can have any value.

A detector 60 is positioned above complex substrate 54 for receiving a total optical response signal to illumination by beam 58. In this case, the total optical response is in the form of a light beam 62 reflected by complex substrate 54 and thin film 52. Detector 60 is a charge-coupled device (CCD), a diode array or any other suitable light detector which can reliably detect light over wavelength range $\Delta\lambda$. A computing unit 64 is connected to detector 60 for processing the reflectance data obtained by detector 60. Computing unit 64 can be a personal computer or any suitable data processing device, as necessary.

It is important that complex substrate 54 exhibit a non-monotonic and appreciably variable substrate reflectance $R_S$ over wavelength range $\Delta\lambda$. In this embodiment these two requirements are fulfilled because complex substrate 54 is made up of two layers 66, 68 of material. Layers 66, 68 have thicknesses $t_{S1}$ and $t_{S2}$ which are on the order of or larger than any wavelength $\lambda$ contained in wavelength range $\Delta\lambda$. Consequently, substrate reflectance $R_S$ varies appreciably as a function of $\lambda$ ($R_S=R_S(\lambda)$).

Figure 5A:
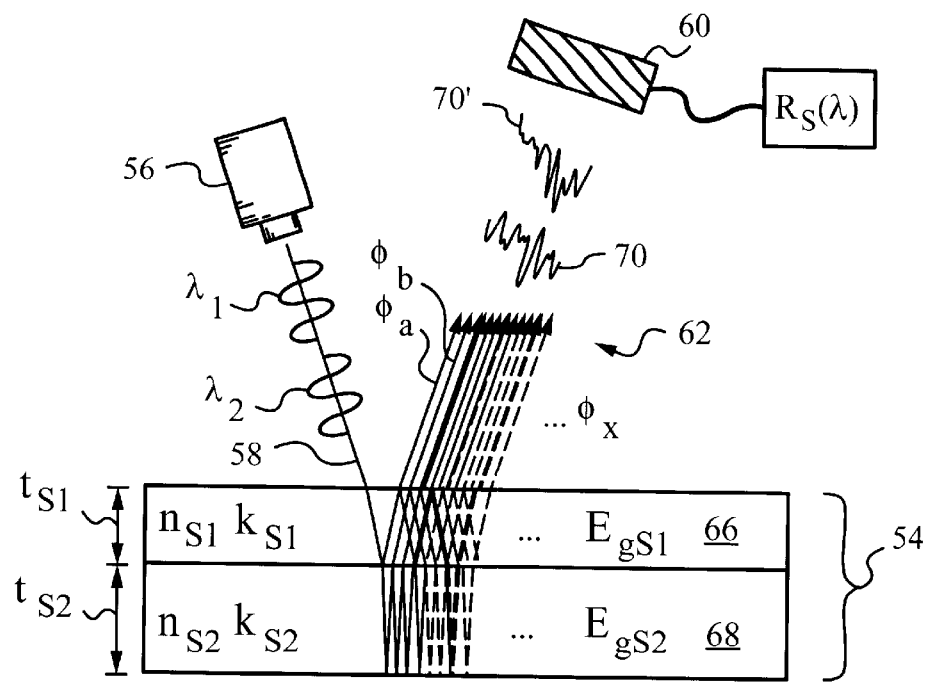
FIG. 5A is a cross sectional view illustrating the light paths in the complex substrate of FIG. 4 in the absence of the thin film.

The variation in substrate reflectance $R_S$ is elucidated in reference to the cross sectional view of FIG. 5A. At a first wavelength $\lambda_1$ selected from wavelength range $\Delta\lambda$ reflected beam 62 contains light portions having certain phases due to the path length differences, as explained above. These phases of the light portions making up reflected beam 62 are indicated by $\phi_a, \phi_b, \ldots \phi_x$ and they differ with respect to each other. As before, the interference of the light portions is incoherent for light portions undergoing multiple internal reflections and transmissions and does not contribute to reflected beam 62. The non-contributing light portions are drawn in dashed lines. The light portions which remain coherent produce a resultant interference signal 70. It is noted that interference signal 70 is shown to have a spatial extent in FIG. 5A for explanatory purposes. In practice the coherently interfering light portions produce reflected beam 62 which represents the sum total of all the interfering light portions. This sum total is the total signal level or total signal of reflected beam 62 as registered by detector 60. At a second wavelength $\lambda_2$ selected from wavelength range $\Delta\lambda$ phases $\phi_a, \phi_b, \ldots \phi_x$ have different values and hence they produce a different interference signal 70' from the light portions which remain coherent. Hence, the total signal of reflected beam 62 changes.

The total signals generated by detector 60 correspond to the total light intensities of interference signals 70 and 70' produced at detector 60 respectively. Since interference signals 70, 70' vary significantly, the light intensity detected by detector 60 also varies significantly. In other words, substrate reflectance $R_S$ varies significantly as a function of $\lambda$ ($R_S=R_S(\lambda)$) because of the corresponding variation in the interference pattern in reflected beam 62. This variation is maximized over all wavelengths within wavelength range $\Delta\lambda$ and in particular at wavelengths at which substrate reflectance $R_S$ is measured. For example, substrate reflectance $R_S$ can be measured at 1 nm wavelength increments between 190 nm and 900 nm.

Specifically, the variation of substrate reflectance $R_S(\lambda)$ has to be non-zero (significant), non-monotonic and appreciably variable over wavelength range $\Delta\lambda$. Preferably, substrate reflectance $R_S(\lambda)$ has an oscillatory form over wavelength range $\Delta\lambda$. A person of average skill in the art will realize that this condition will require proper selection of materials making up layers 66, 68 of complex substrate 54. In particular, a person skilled in the art will recognize that this goal is achieved by selecting layers 66, 68 having certain thicknesses $t_{S1}, tS_2$ on the order of or larger than the shortest wavelength contained in wavelength range $\Delta\lambda$. Furthermore, layers 66, 68 have to have certain indices of refraction $n_{S1}, n_{S2}$ and extinction coefficients $k_{S1}, k_{S2}$. Layers 66, 68 are selected to maximize the effect of multiple internal reflections in complex substrate 54. To achieve this effect layer 66 should exhibit a very small value $k_{S1}$, at least over wavelength range $\Delta\lambda$. In other words, layer 66 should preferably act as a transparent material over wavelength range $\Delta\lambda$.

Layer 66 can be made of $SiO_2$ and layer 68 can be made of Si. In fact, generally materials from among Si, $SiO_2$ and $SiO_xN_y$ are suitable for use in layer 68 while layer 66 can be made of $SiO_2$ or $SiO_xN_y$. For example, layer 66 is an $SiO_2$ layer of thickness $t_{1S}$ between 2000 and 6000 Angstroms and layer 68 is an Si layer of thickness $t_{2S}$ on the order of half a millimeter.

Optical determination of film thickness $t_f$ of film 52 is based on the values of total reflectance $R_T$ obtained by illuminating complex substrate 54 with beam 58 after film 52 is deposited. Total reflectance $R_T$ consists of substrate reflectance $R_S$ and a reflectance difference due to the presence of thin film 52. The value of substrate reflectance $R_S$ is an important reference value and it is measured first before depositing film 52. Alternatively, film 52 may not be deposited on entire complex substrate 54 as indicated in FIG. 4. In the latter case, substrate reflectance $R_S$ can be re-measured at any time, as indicated in dashed lines in FIG. 4.

Figure 5B:
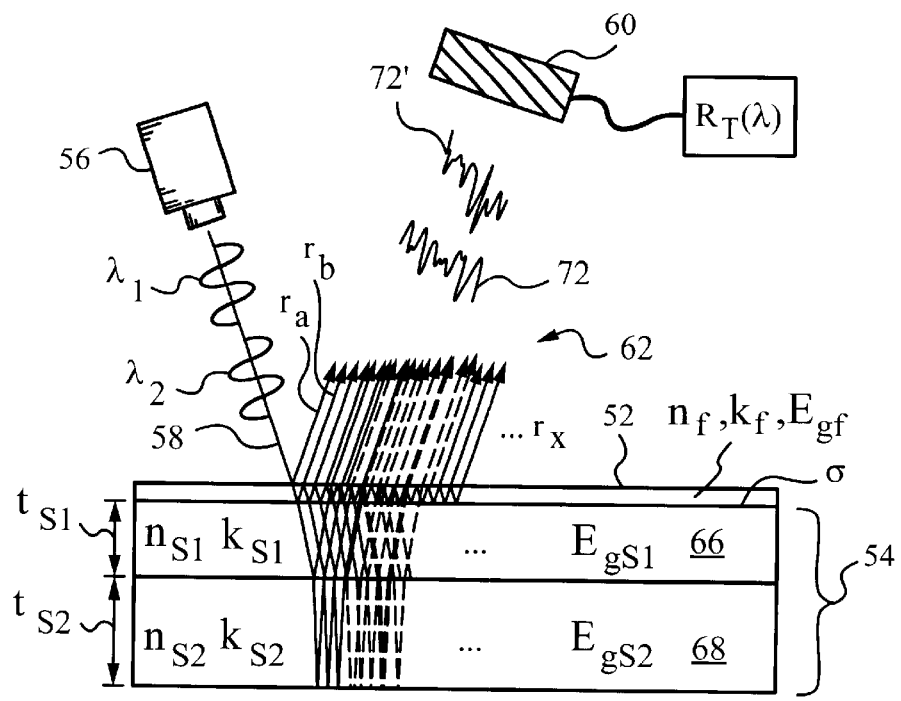
FIG. 5B is a cross sectional view illustrating the light paths in the complex substrate of FIG. 4 in the presence of the thin film.

FIG. 5B illustrates the measurement of total reflectance $R_T$. At first wavelength $\lambda_1$ reflected beam 62 has reflected light portions $r_a, r_b, \ldots r_x$ with different phases $\gamma_a, \gamma_b, \ldots \gamma_x$. Once again, because of loss of coherence, some of the light portions undergoing multiple reflections and transmissions within complex substrate 54 do not contribute to reflected beam 62. These non-contributing light portions are indicated by dashed lines. The remaining light portions, due to the differences between phases $\gamma_a, \gamma_b, \ldots \gamma_x$, produce a resultant interference signal 72 corresponding to a total signal level of reflected beam 62 registered at detector 60. It should be noted that light portions undergoing internal reflections within film 52 retain their coherence and hence contribute to resultant interference signal 72. At second wavelength $\lambda_2$ selected from wavelength range $\Delta\lambda$ phase shifts $\gamma_a, \gamma_b, \ldots \gamma_x$ of contributing light portions have different values and hence they produce a different interference signal 72'.

The total signals generated by detector 60 correspond to the total light intensities of interference signals 72 and 72'. produced at detector 60 respectively. Since interference signals 72, 72' vary significantly, the light intensity detected by detector 60 also varies significantly. In other words, total reflectance $R_T$ varies significantly as a function of $\lambda$ ($R_T=R_T(\lambda)$) because of the corresponding variation in the interference pattern in reflected beam 62. Once again, total reflectance $R_T$ can be measured at 1 nm wavelength increments between 190 nm and 900 nm.

The structure of complex substrate 54 maximizes the effect of multiple internal reflections in substrate 54 and film 52. Specifically, by maximizing the number of reflections within substrate 54 the quantity of light portions making up reflected beam 62 is large. Thus, the total path length of reflected beam 62 in film 52 is maximized. The path length of reflected beam 62 in film 52 is further increased by taking into account the n and k values of film 52 when selecting $n_{S1}$, $n_{S2}$ and $k_{S1}, k_{S2}$ values of layers 66, 68. A person of average skill in the art will be able to make the appropriate choice of materials.

Total reflectance $R_T$ is a signal which is a combination of substrate reflectance $R_S$ and a reflectance difference $\Delta R$ due to film 52. Complex substrate 54 renders reflectance difference $\Delta R$ non-zero, non-monotonic and appreciably variable over wavelength range $\Delta\lambda$. These characteristics of reflectance difference $\Delta R$ increase and make more apparent the contribution of film 52 to total reflectance $R_T$. In turn, having a larger and more apparent signal due to film 52 contributing to beam 62 allows one to more accurately determine the physical parameters of film 52.

Figure 6A:
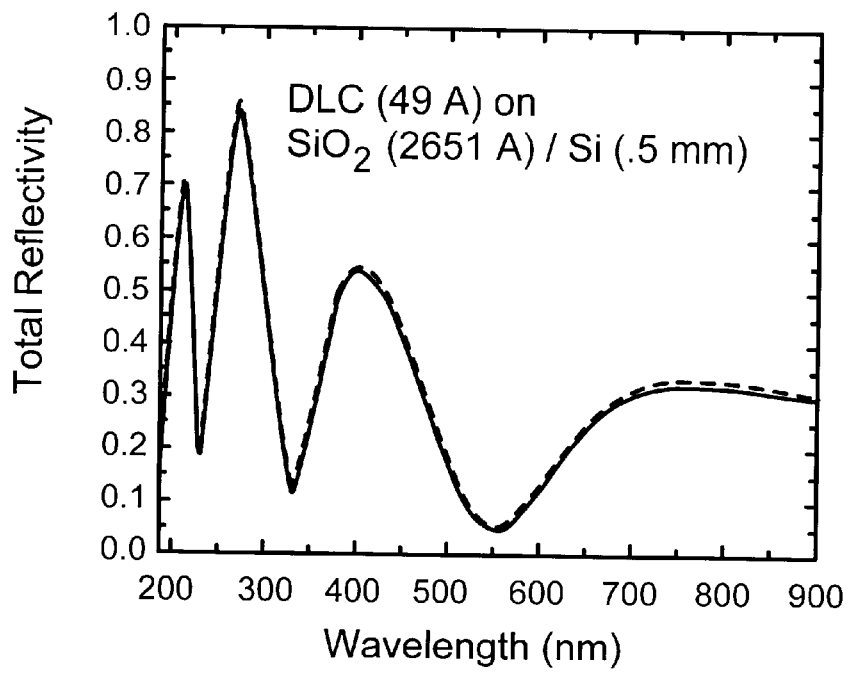
FIG. 6A is a graph of a total reflectance $R_T$ of a thin film of DLC on a complex substrate of $SiO_2/Si$ according to the invention.
Figure 6B:
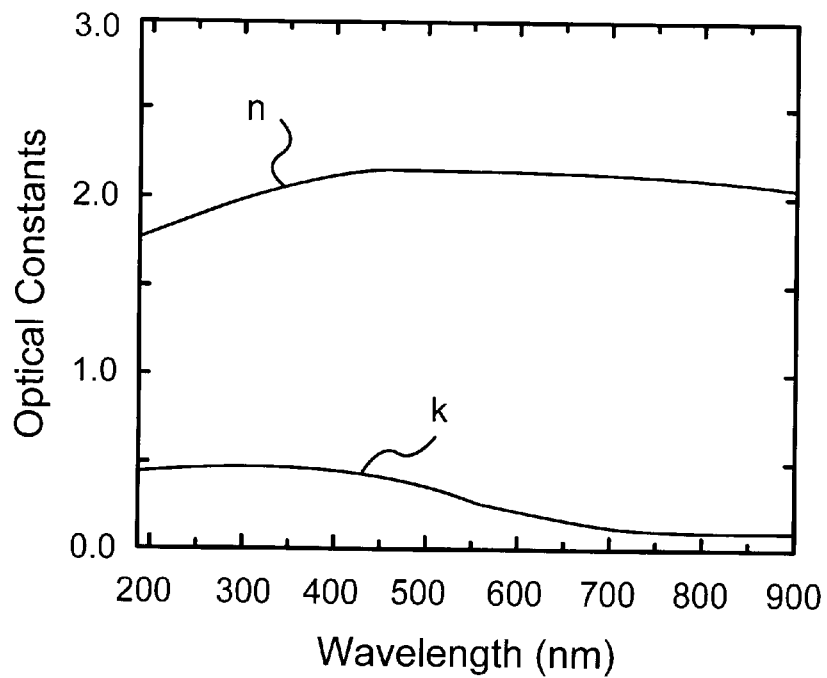
FIG. 6B is a graph of the n and k coefficients obtained for the DLC film in accordance with the invention.

Practical applications of the method of the invention yield excellent results. In particular, FIG. 6A shows the variation of total reflectance $R_T$ as a function of wavelength $\lambda$ for a 49 Angstrom thin film of diamond-like carbon (DLC) coated on a complex substrate composed of a 2651 Angstrom thick layer of $SiO_2$ on a 0.5 mm thick layer of Si. The graph of theoretical total reflectance $R_{T(th)}(\lambda)$ designated by a dashed line is very close to the measured total reflectance $R_T(\lambda)$ designated by a continuous line. Clearly, total reflectance $R_T$(λ) has a non-monotonic and appreciably varying form as prescribed by the method of the invention. The wavelength range Δλ of interest extends from 190 nm to 900 nm. FIG. 6B shows the corresponding values of physical parameters n and k calculated for the DLC film.

Figure 7A:
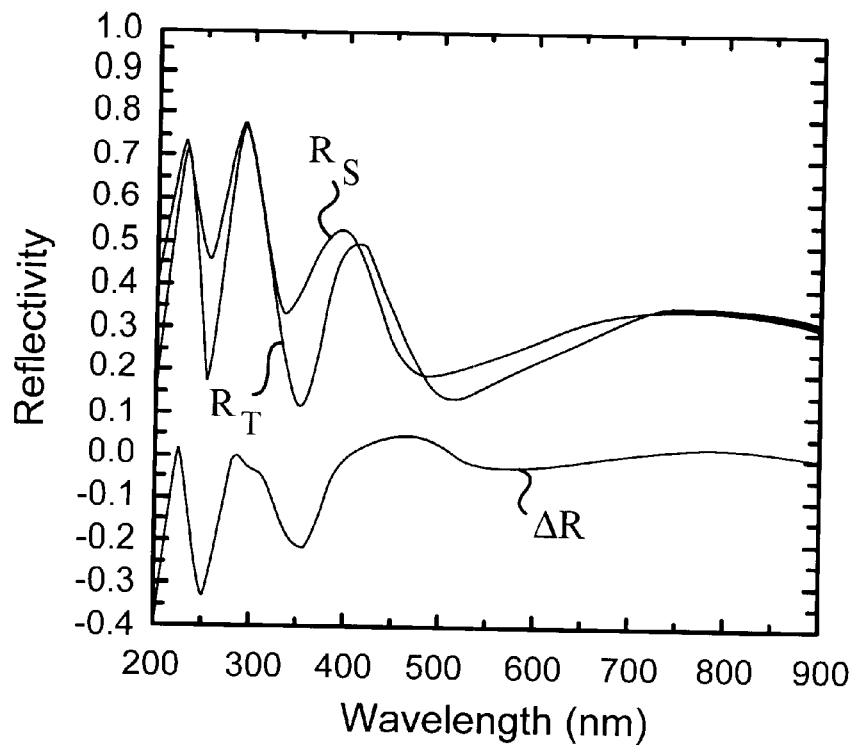
FIG. 7A is a graph of substrate reflectance $R_S$, total reflectance $R_T$ and reflectance difference $\Delta R$ obtained using a complex substrate according to the invention.
Figure 7B:
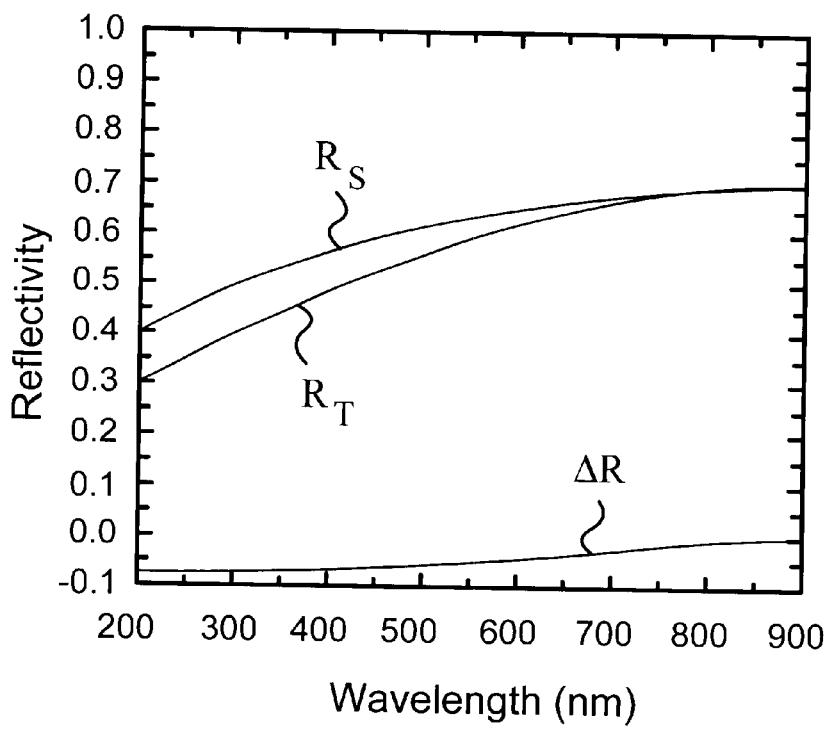
FIG. 7B is a graph of substrate reflectance $R_S$, total reflectance $R_T$ and reflectance difference $\Delta R$ obtained using a prior art substrate.

FIG. 7A shows substrate reflectance $R_S(\lambda)$ total reflectance $R_T(\lambda)$ with a 48 Angstrom DLC film and reflectance difference ΔR(λ). All three of these graphs are non-monotonic and exhibit an appreciable, oscillatory-type variation. Under these conditions, determination of the physical parameters of the DLC film can be performed to a high degree of accuracy. For example, film thickness can be measured to within 3 Angstroms or less. For comparison, FIG. 7B shows the result of using a conventional substrate with the same 48 Angstrom DLC film. Clearly, substrate reflectance $R_S(\lambda)$ is monotonic and not appreciably variable. The same is true of total reflectance $R_T(\lambda)$ and therefore also of reflectance difference ΔR (λ). To compound these problems, ΔR(λ) is very close to zero indicating that the presence of the DLC film does not significantly contribute to total reflectance $R_T(\lambda)$. In other words, the signal due to the presence of the DLC film is very low. Under these conditions physical parameters can not be accurately measured and their values can be off by 80% or even more.

The actual determination of physical parameters of film 52 can be performed in accordance with any known method. The computation can be based on a dispersion model or it can disregard dispersion. Preferably, the Forouhi-Bloomer dispersion model is employed by unit 64 to determine the physical parameters.

Specifically, the Forouhi-Bloomer model is used to calculate an ideal case total reflectance spectrum or theoretical total reflectance $R_{T(th)}$ of an ideal or reference sample of complex substrate 54 and film 52. Theoretical total reflectance $R_{T(th)}$ is generated by modeling the total reflectance of film 52 and substrate 54 as a function of $n_f(\lambda)$, $k_f(\lambda)$, $t_f$, $\sigma_f$, $n_{S1}(\lambda)$, $k_{S1}(\lambda)$, $t_{S1}$, $n_{S2}(\lambda)$, $k_{S2}(\lambda)$ and $t_{S2}$; these are the physical parameters to be determined. Interface roughness between layers 66, 68 as well as the bandgap energies of film 52 and layers 66, 68 can also be included as physical parameters. The details of this model are described, e.g., in U.S. Pat. No. 4,905,170.

Once theoretical total reflectance $R_{T(th)}$ is calculated, unit 64 analyzes or curve fits it by varying the physical parameters of layer 52 around the actual value of the ideal sample. The fit can be performed by using any appropriate mathematical fitting method such as a mean average difference fit or a non-linear least squares fit. In this case the non-linear least squares fit is used which minimizes the value of δ expressed as follows:

$$\delta = \sqrt{\frac{1}{N}\sum_{i=1}^{N}[R_T(\lambda_i) - R_{T(th)}(\lambda_i)]^2}.$$

In the present example N is 711, since reflectances are measured in 1 nm increments over Δλ=710 nm (from 190 nm to 900 nm) During curve fitting the physical parameters and the Forouhi-Bloomer parameters (n (∞), A, B, C and $E_g$) are varied to minimize δ. Several iterations are usually necessary to obtain minimum δ. The curve fitting is used to determine physical parameters of film 52 within predetermined ranges or tolerances. The tolerances depend on the effectiveness of complex substrate 54 at maximizing the effect of multiple internal reflections within complex substrate 54 and thin film 52. A person skilled in the art will recognize that this curve fitting process can be used as a tool in optimizing complex substrate 54 e.g. making the proper selection of layers 66, 68. Specifically, complex substrates producing the best quality fits with the smallest tolerances are preferred.

Figure 8A:
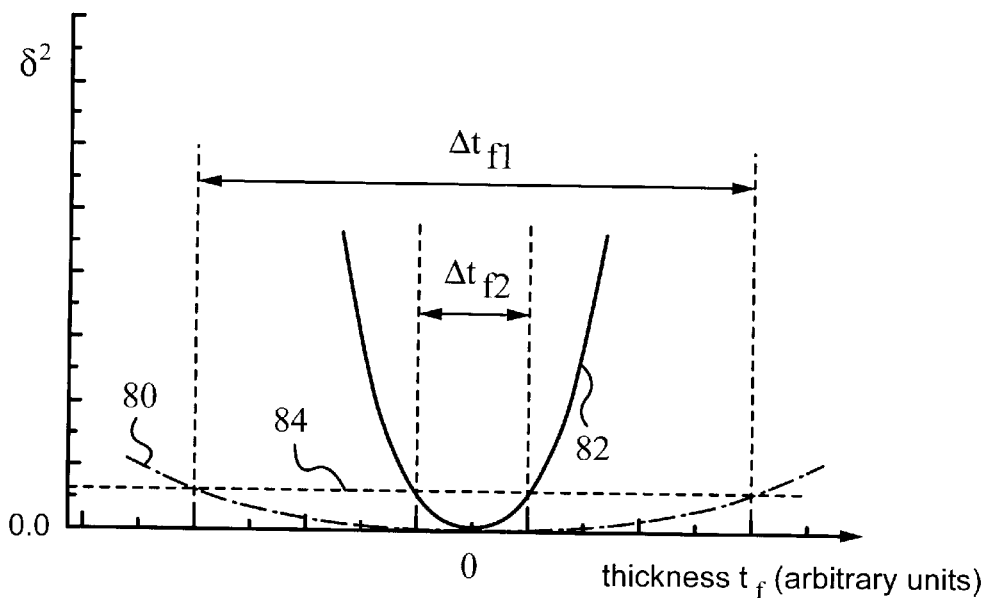
FIG. 8A–B are graphs illustrating the adjustment of a fitting parameter $\delta$ used in deriving the values of film thickness according to the invention.

The graphs in FIG. 8A illustrate the general principles of how the least-squares fit is used to obtain an accurate value of thickness $t_f$ of film 52 and determine the best complex substrate 54 to be used in reflectance measurements. The dashed and dotted graph 80 represents $\delta^2$ as a function of error or deviation in thickness $t_f$. Graph 80 was obtained from total reflectance measurements of film 52 coated on a simple prior art substrate. Graph 80 is flat around its minimum. This means that there are no significant constraints on the curve fitting. Thus, the accuracy with which thickness $t_f$ can be determined is low. In this case unit 64 has a threshold or resolution limit designated by line 84 and can not distinguish or resolve values below line 84. Hence, the accuracy with which thickness $t_f$ can be determined from graph 80 is within a wide range $\Delta t_{f1}$.

Graph 82 of $\delta^2$ vs. error in $t_f$ is obtained from total reflectance measurements of film 52 coated on complex substrate 54 of the invention. Graph 82 is a much better constrained because the region of graph 82 around the minimum is not as flat as in graph 80. In other words, the minimum of graph 82 is sharper or has a higher degree of inflection. Consequently, the accuracy of thickness $t_f$ is within a small range $\Delta t_{f2}$. It is preferred that complex substrate 54 be adjusted such that the minimum of graph 82 be as sharp as possible.

Figure 8B:
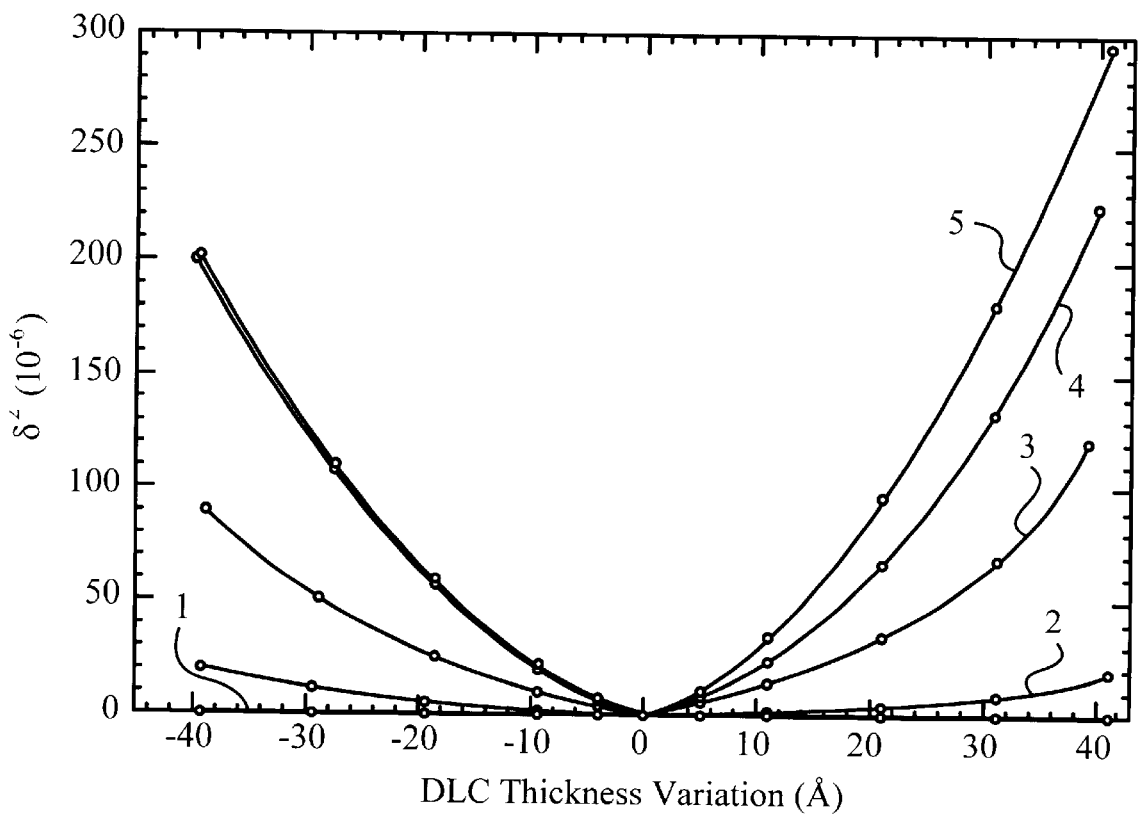

As an example, FIG. 8B illustrates graphs of $\delta^2$ vs. $t_f$ error obtained for total reflectance measurements of film 52 on a prior art substrate (graph 1) and on complex substrate 54 (graphs 2&3) as follows: 1) DLC (49 Å)/Mag (280 Å)/Cr (400 Å)/NiP; 2) DLC (49 Å)/SiO$_2$ (2651 Å)/Si (0.5 mm); 3) DLC (149 Å)/SiO$_2$ (2651 Å)/Si (0.5 mm). Curve 1 is for a finished magnetic disk. This curve is very flat, showing lack of constraints in the curve fitting. Curve 2 shows significant constraints. Comparing to curve 2 curve 3 shows better constraints, which demonstrate that thicker film has stronger constraints.

The method of the invention allows one to determine thickness $t_f$ to within a tolerance or range $\Delta t_{f2}$ of 5 Angstroms or less. In fact, the lowest values of $\Delta t_{f2}$ are achieved by using the Forouhi-Bloomer method in conjunction with a fitting technique which takes into account the degree of inflection of $\delta^2$ around its minimum by including a first derivative of the theoretical and measured total reflectances. Fitting techniques using derivatives are well known in the art. For example, the following curve fitting utilizing the first derivative can be employed:

$$\delta = \sqrt{\frac{\sum_{i=1}^{N}[R_T(\lambda_i) - R_{T(th)}(\lambda_i)]^2}{N-1} + \frac{\sum_{i=1}^{N}\left[\frac{\partial R_T(\lambda_i)}{\partial \lambda_i} - \frac{\partial R_{T(th)}(\lambda_i)}{\partial \lambda_i}\right]^2}{N-1}}.$$

This fitting technique is more rigorous and will yield more accurate values for the physical parameters of film 52 and specifically thickness $t_f$. Of course, this fitting technique is more computationally demanding on unit 64 and may be reserved for ultra-high accuracy determinations of the physical parameters of film 52.

In alternative embodiments of the invention, a more complex substrate structure can be employed to maximize the effect of internal reflections in accordance with the principles laid out above. In this manner reflectance difference ΔR or the signal due to the thin film can be further increased to obtain accurate readings of the film's physical parameters.

Figure 9:
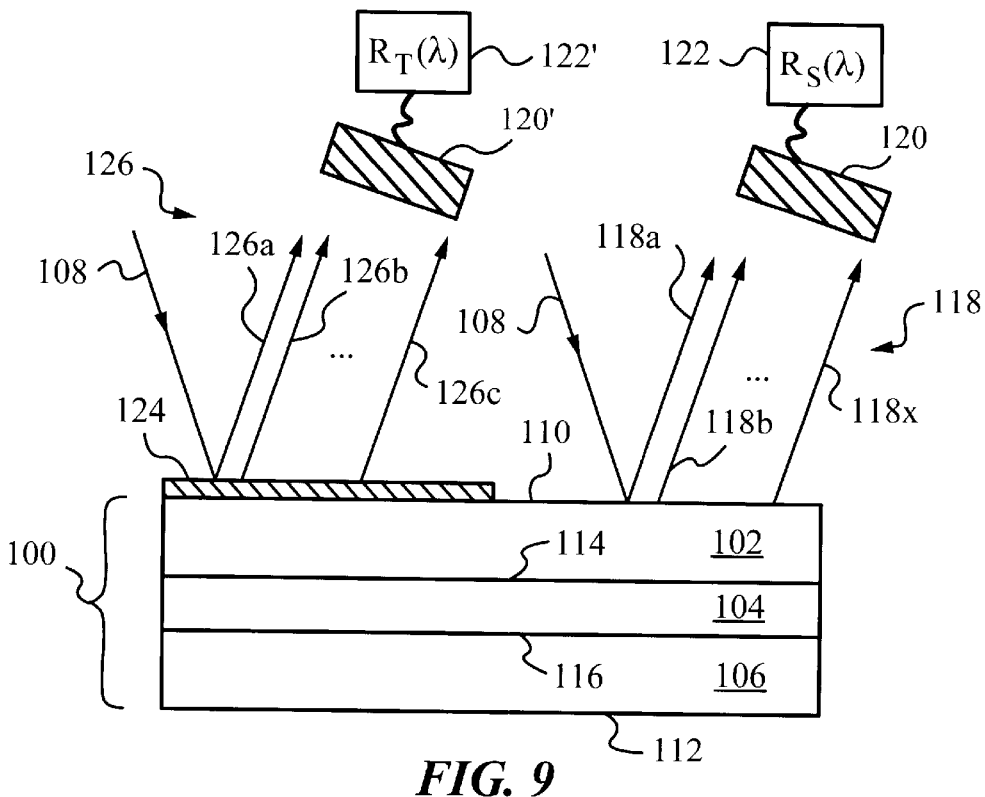
FIG. 9 is a cross sectional view of a general complex substrate according to the invention.

FIG. 9 illustrates a complex substrate 100 having three layers 102, 104, 106. An incident test beam 108 is reflected by complex substrate 100 as shown. Substrate reflectance $R_S$ in this case depends on the parameters of all three layers 102, 104 and 106. The various paths within complex substrate 100 are not explicitly shown, however, as in the above case, reflections and transmittances take place at top and bottom surfaces 110, 112 of complex substrate 100 as well as at interfaces 114, 116. Hence, a reflected beam 118 contains contributing light portions 118a, 118b, . . . 118x having different phases with respect to each other. The differences between the phases of light portions 118a, 118b, . . . 118x vary as a function of wavelength λ of beam 108. Therefore, reflected beam 118 has a varying intensity or varying substrate reflectance $R_S$ as a function of wavelength λ.

A detector 120 receives reflected beam 118 and measures the signal strength or substrate reflectance $R_S$ with changing λ. The signal strength measurement is fed to a computing unit 122 which records substrate reflectance $R_S$ as a function of wavelength λ over a wavelength range Δλ.

As in the previous embodiment, the measurement of total reflectance $R_T$ is performed by illuminating complex substrate 100 and deposited film 124 with beam 108 over the same wavelength range Δλ. In this case a reflected beam 126 is composed of contributing light portions 126a, 126b, . . . 126x having different phases which vary as a function of wavelength λ. A separate detector 120' and computing unit 122' are used to intercept beam 126 and determine total reflectance $R_T$.

Complex substrate 100 in this embodiment is more intricate by virtue of having three layers. Use of complex substrates with even more layers is also possible. It is important, however, that complex substrate maximize the effect of multiple reflections within the complex substrate and the thin film, as discussed above.

Figure 10:
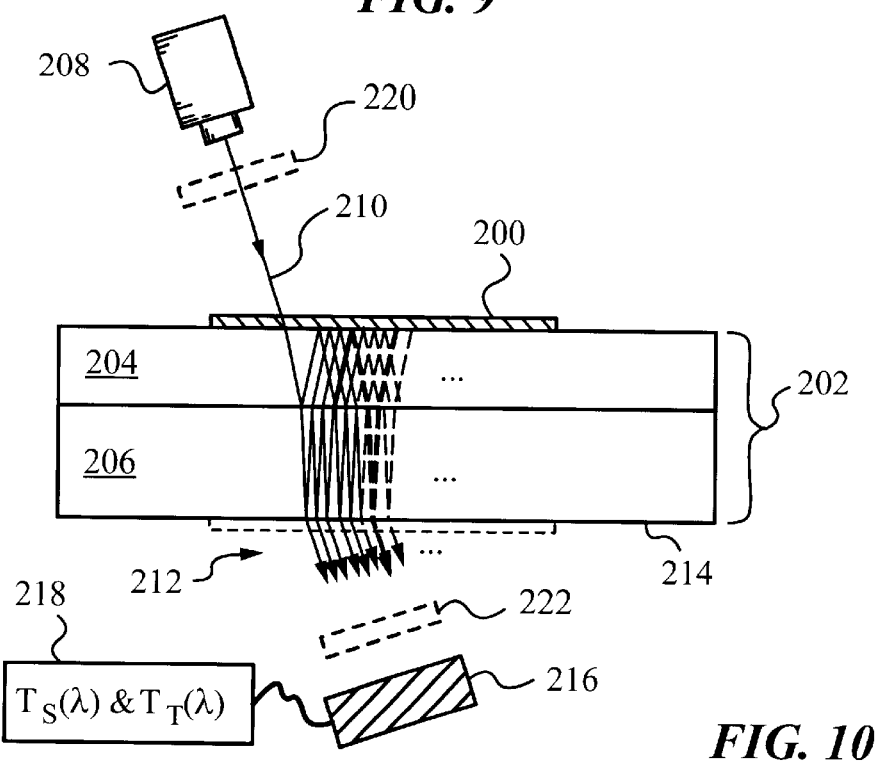
FIG. 10 is a cross sectional view of an arrangement for transmittance measurements in accordance with the invention.

FIG. 10 illustrates how a transmittance measurement is performed on thin film 200 deposited on a complex substrate 202 consisting of two layers 204 and 206. Once again, a light source 208 providing a test beam 210 covering a wavelength range Δλ is incident on complex substrate 202 and thin film 200. In this case both layers 204, 206 a transmitted beam 212 issuing from a bottom surface 214 of complex substrate 202 is studied. It should be noted that in an alternative embodiment, thin film 200 can be deposited on bottom surface 214.

A detector 216 is positioned to intercept transmitted beam 212 to measure a total transmittance $T_T$ of film 200 and complex substrate 202. For reference, detector 216 measures a substrate transmittance $T_s$ of complex substrate 202 before film 200 is deposited. Detector 216 is connected to a computing unit 218 which calculates the physical parameters of thin film 200 based on total transmittance $T_T$ in the same manner as in the embodiments in which the reflected beam is studied.

In accordance with the invention, physical parameters of thin films can be determined from light properties other than just the intensity of the reflected or transmitted beam. Specifically, the properties of s- and p-polarized light in reflected or transmitted beams can be studied. For this purpose, a first polarizer 220 is placed before light source 208 and a second polarizer sometimes also referred to as analyzer 222 is placed before detector 216. Either one or both polarizers 220, 222 can be used depending on the desired measurement.

A person of average skill in the art will appreciate that any ellipsometric measurements can be performed with the aid of one or both polarizers 220, 222. For example, polarizer 220 may be set to only pass s-polarized light and polarizer 222 may be also be set to only pass s-polarized light. In this case test beam 210 incident on film 200 will only contain s-polarization and detector 216 will only detect s-polarization of transmitted beam 212. The same measurement can be repeated with polarizers 220, 222 switched to pass only p-polarized light. Measurement of both polarizations enables one to determine the amplitude Ψ (Psi) and phase Δ (Delta) of transmitted beam 212 from the ratios of the transmitted polarizations. The physical parameters of film 200 can then be computed from the results of any one or any combination of ellipsometric measurements.

Figure 11A:
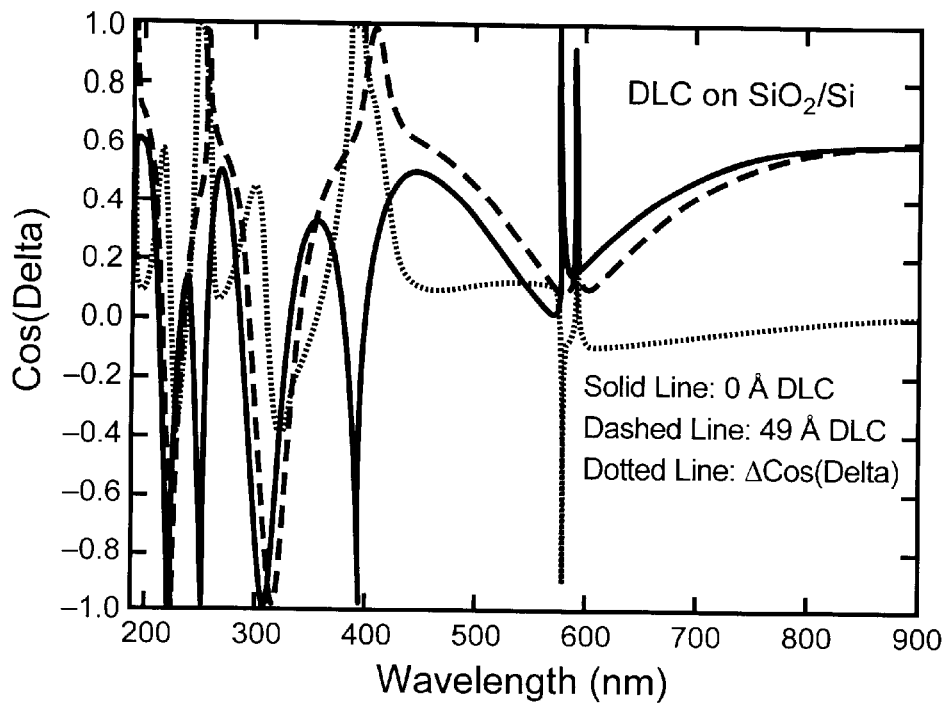
FIG. 11A–D are graphs illustrating ellipsometric measurements.
Figure 11B:
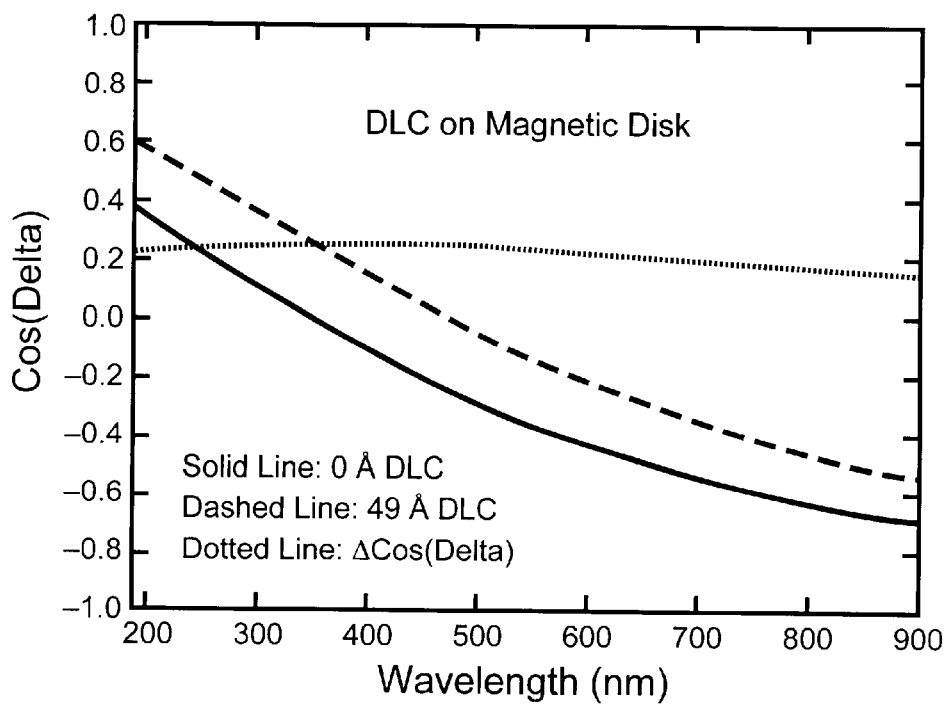
Figure 11C:
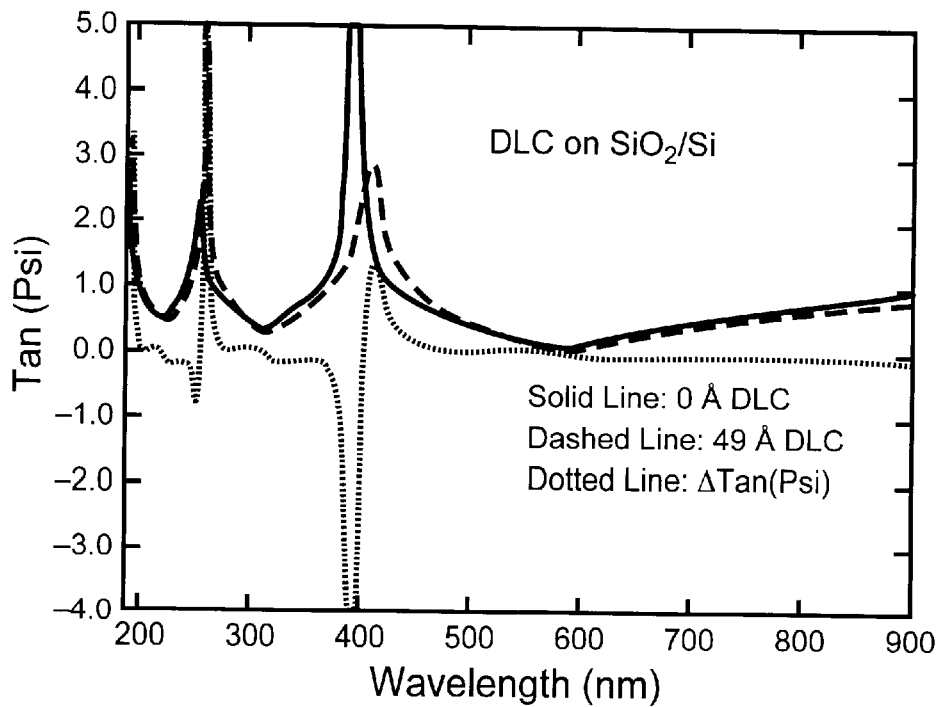
Figure 11D:
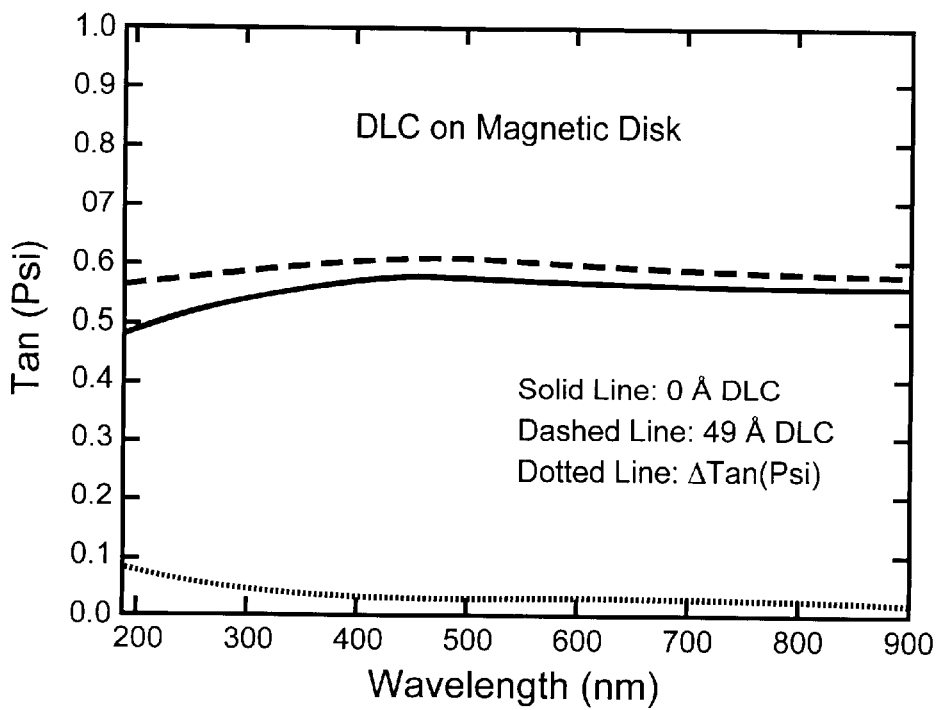

FIGS. 11A–D illustrate the results of ellipsometric measurements. FIG. 11A shows the graphs of Cos(Delta) for three thickness values of a thin film of DLC on a complex substrate of $SiO_2$/Si. For comparison FIG. 11B illustrates the results of the same measurement for a DLC film deposited on a magnetic disk. FIG. 11C shows the measurements of Tan(Psi) of the same thin DLC film, and FIG. 11D illustrates Tan(Psi) for the DLC film deposited on a magnetic disk.

Figure 12:
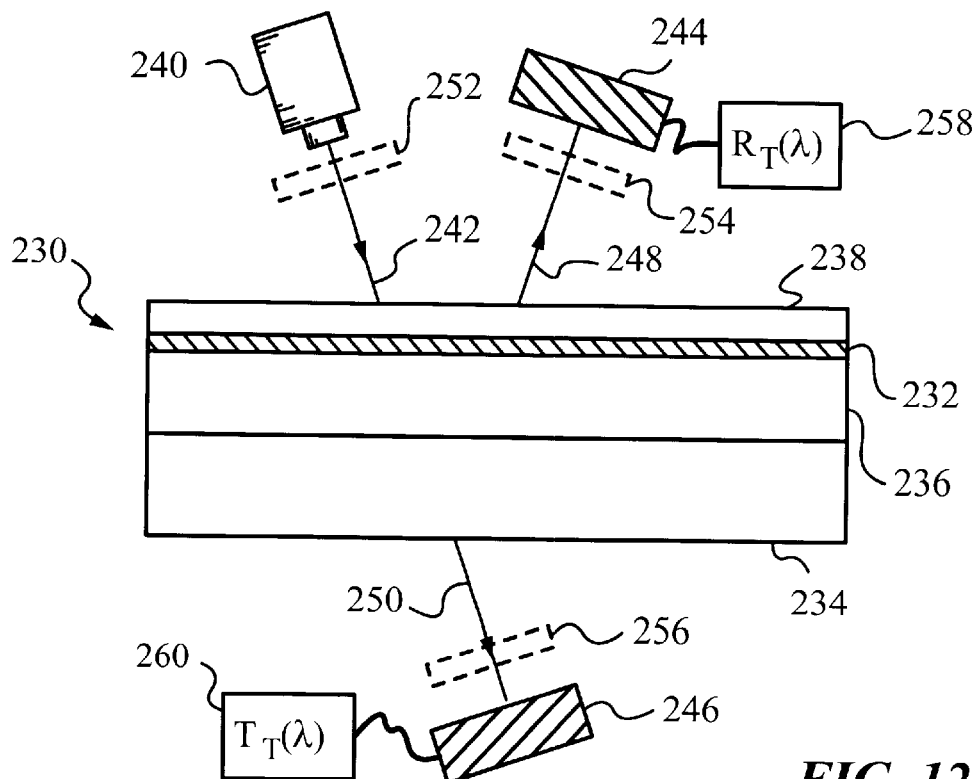
FIG. 12 is a cross sectional view of an arrangement for transmittance and reflectance measurements of a thin film sandwiched between two layers of a complex substrate according to the invention.

FIG. 12 illustrates yet another embodiment of a complex substrate 230 for performing reflectance and transmittance measurements of a thin film 232. Substrate 230 has three layers 234, 236 and 238 selected to maximize the effect of multiple internal reflections within substrate 230 and film 232. The beam paths within substrate 230 and film 232 are not shown for reasons of clarity. As in the previous embodiments, a light source 240 delivers a test beam 242 spanning wavelength range Δλ. Detectors 244, 246 are set up to receive reflected beam 248 and transmitted beam 250 respectively. Optional polarizers 252, 254, 256 are provided for ellipsometric measurements, as necessary. Computing units 258, 260 are connected to detectors 244, 246 for determining the physical parameters of film 232. Of course, units 258, 260 can be replaced by a single unit.

The advantage of substrate 230 which sandwiches film 232 between two of its layers 236, 238 is improved accuracy in determining the physical parameters. This is illustrated in FIG. 8B for two examples of measuring film thickness $t_f$ when substrate 230 sandwiches film 232. These curves show: 4) $SiO_2$ (1000 Å)/DLC (49 Å) /$SiO_2$ (1651 Å)/Si (0.5 mm); 5) $SiO_2$ (1000 Å)/DLC (49 Å)/$SiO_2$ (3000 Å)/Si (0.5 mm). The sandwiched structure enhances the signal due to film 232 in comparison to structures with the film deposited on top of the complex substrate (curves 2 and 3) and thus improves the data analysis precision even more.

Figure 13:
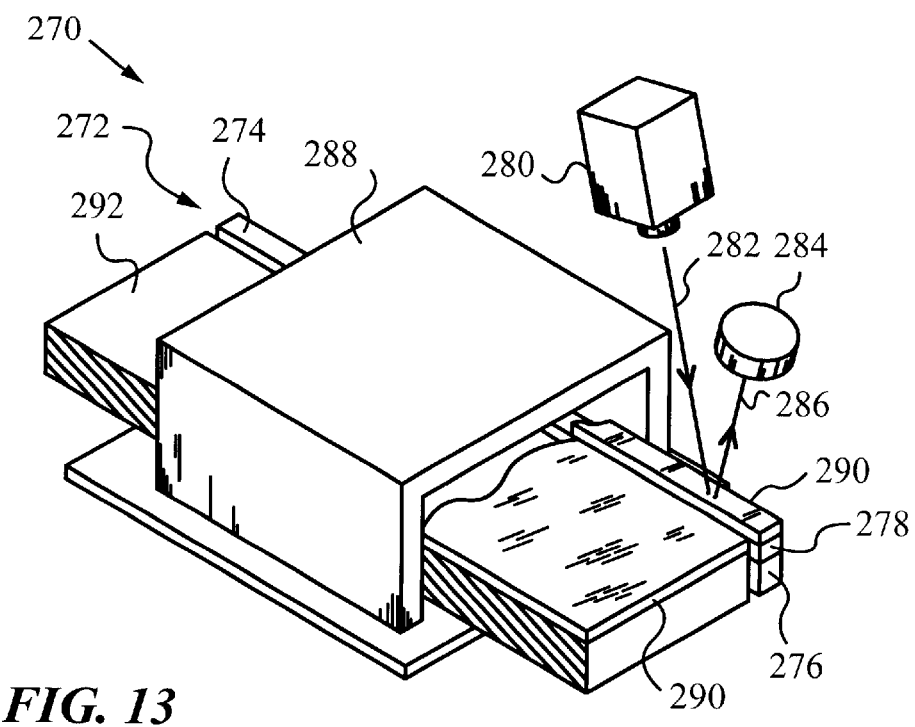
FIG. 13 is an isometric view of a system employing a monitoring sample with a complex substrate.

FIG. 13 illustrates how the method of the invention is applied in a system 270 using a monitoring sample 272. Monitoring sample 272 is a complex substrate 274 built of two layers 276, 278. A light source 280 provides a test beam 282 and a detector 284 is arranged to measure the optical response of sample 272 in the form of reflected beam 286.

System 270 has a deposition mechanism 288 e.g., a deposition chamber for depositing a thin film 290 on a substrate 292 e.g., a magnetic medium or other material to be coated. Monitoring sample 272 also advances through chamber 288 and is coated with film 290 under the same conditions as medium 292. Care has to be taken to ensure that the deposition rates on monitoring sample 272 are equal to those on medium 292.

Measurement of total reflectance $R_T$ by detector 284 is processed by a computing unit (not shown) to determine the physical parameters of film 290. When deposition rates on monitoring sample are matched to those on medium 292 the measurement of the physical properties of film 290 on monitoring sample provides the necessary data about the corresponding physical parameters of film 290 coated on medium 292.

Once the method of the invention is used to determine one or more physical parameters of a thin film, e.g., the values on n and k, then the film can be coated on a regular substrate as necessary. The values of n and k obtained in accordance with the invention will aid in determining the thickness of the film deposited on a regular substrate in accordance with prior art methods.

Figure 14:
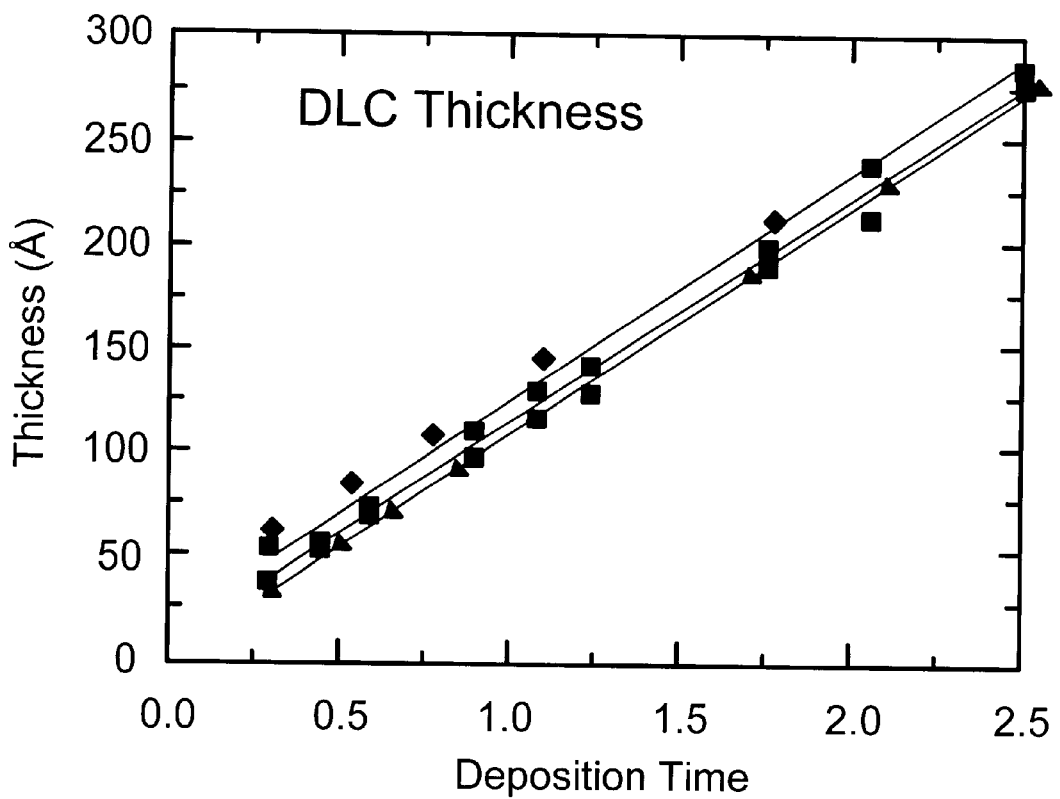
FIG. 14 is a graph comparing the performance of a film thickness measurement according to the invention with several prior art measurements.

FIG. 14 compares thickness measurements of a DLC film performed by the method of the present invention with two popular prior art methods. The triangles and circles indicate thickness data points obtained with the method of the invention. The rotated squares indicate the data points collected by the step-height method and the upright squares indicate data obtained with an atomic force microscope.

It will be clear to one skilled in the art that the above embodiment may be altered in many ways without departing from the scope of the invention. Accordingly, the scope of the invention should be determined by the following claims and their legal equivalents.

What is claimed is:

1. A method for optically determining a physical parameter of a thin film, said method comprising the following steps:
   a) providing a test beam;
   b) selecting a wavelength range $\Delta\lambda$ for said test beam;
   c) providing a complex substrate having at least two layers and a non-monotonic and appreciably variable substrate optical response over said wavelength range $\Delta\lambda$;
   d) measuring said substrate optical response;
   e) depositing said thin film on said complex substrate;
   f) illuminating said thin film on said complex substrate with said test beam to obtain a total optical response comprising said substrate optical response and an optical response difference due to the presence of said thin film, wherein said complex substrate renders said optical response difference non-zero, non-monotonic and appreciably variable over said wavelength range $\Delta\lambda$; and
   g) determining said physical parameter from said total optical response.

2. The method of claim 1, wherein said substrate optical response is a substrate reflectance, said optical response difference is a reflectance difference due to the presence of said thin film, said total optical response is a total reflectance comprising said substrate reflectance and said reflectance difference, and said illumination step produces a reflected beam.

3. The method of claim 2, further comprising the step of analyzing said reflected beam to determine said physical parameter from at least one light property selected from the group consisting of s-polarization, p-polarization, s-polarization amplitude, p-polarization amplitude, s-polarization phase, p-polarization phase.

4. The method of claim 2, wherein said reflected beam is analyzed by an ellipsometric technique.

5. The method of claim 2, wherein said step of determining said physical parameter comprises using a dispersion model.

6. The method of claim 5, wherein said dispersion model is the Forouhi-Bloomer dispersion model.

7. The method of claim 1, wherein said substrate optical response is a substrate transmittance, said optical response difference is a transmittance difference due to the presence of said thin film, said total optical response is a total transmittance comprising said substrate transmittance and said transmittance difference, and said illumination step produces a transmitted beam.

8. The method of claim 7, further comprising the step of analyzing said transmitted beam to determine said physical parameter from at least one light property selected from the group consisting of s-polarization, p-polarization, s-polarization amplitude, p-polarization amplitude, s-polarization phase, p-polarization phase.

9. The method of claim 7, wherein said transmitted beam is analyzed by an ellipsometric technique.

10. The method of claim 7, wherein said step of determining said physical parameter comprises using a dispersion model.

11. The method of claim 10, wherein said dispersion model is the Forouhi-Bloomer dispersion model.

12. The method of claim 1, wherein a structure of said complex substrate is chosen such that said optical response difference is non-zero, non-monotonic and appreciably variable over said wavelength range $\Delta\lambda$.

13. The method of claim 1, wherein said at least two layers are selected to maximize the effect of multiple internal reflections in said complex substrate and in said thin film.

14. The method of claim 1, wherein said physical parameter is selected from the group consisting of thickness t, index of refraction n, extinction coefficient k and energy bandgap $E_g$.

15. An apparatus for optically determining a physical parameter of a thin film, said apparatus comprising:
   a) a complex substrate having at least two layers and a non-monotonic and appreciably variable substrate optical response over a wavelength range $\Delta\lambda$, said complex substrate having said thin film deposited thereon;
   b) a light source for illuminating said complex substrate and said thin film with a test beam spanning said wavelength range $\Delta\lambda$;
   c) a detector for measuring over said wavelength range $\Delta\lambda$ said substrate optical response and a total optical response comprising said substrate optical response and an optical response difference due to the presence of said thin film, wherein said complex substrate renders said optical response difference non-zero, non-monotonic and appreciably variable over said wavelength range $\Delta\lambda$; and
   d) a computing unit in communication with said detector for determining said physical parameter from said total optical response.

16. The apparatus of claim 15, wherein a material composition of each of said at least two layers is selected such that said optical response difference is non-zero, non-monotonic and appreciably variable over said wavelength range $\Delta\lambda$.

17. The apparatus of claim 16, wherein said material composition is selected from the group of materials consisting of $SiO_2$, Si, $SiO_xN_y$.

18. The apparatus of claim 15, wherein said material composition of each of said at least two layers is selected to maximize the effect of multiple internal reflections in said complex substrate and in said thin film.

19. The apparatus of claim 15, wherein said physical parameter is selected from the group consisting of thickness t, index of refraction n, extinction coefficient k and energy bandgap $E_g$.

20. The apparatus of claim 15, further comprising a first polarizing means for polarizing said test beam.

21. The apparatus of claim 15, wherein said total optical response comprises a light beam selected from the group consisting of a transmitted beam and a reflected beam, and said apparatus further comprises a second polarizing means positioned in the path of said light beam.

22. A system using a monitoring sample for optically monitoring a physical parameter of a thin film, wherein said monitoring sample comprises a complex substrate having at least two layers and a non-monotonic and appreciably variable substrate optical response over a wavelength range $\Delta\lambda$, said system comprising:
   a) a depositing means for depositing said thin film on said complex substrate;
   b) a light source for illuminating said complex substrate and said thin film with a test beam spanning said wavelength range $\Delta\lambda$;
   c) a detector for measuring over said wavelength range $\Delta\lambda$ said substrate optical response and a total optical response comprising said substrate optical response and an optical response difference due to the presence of said thin film, wherein said complex substrate renders said optical response difference non-zero, non-monotonic and appreciably variable over said wavelength range $\Delta\lambda$; and
   d) a computing unit in communication with said detector for determining said physical parameter from said total optical response.

23. The system of claim 22, wherein a material composition of each of said at least two layers is selected such that said optical response difference is non-zero, non-monotonic and appreciably variable over said wavelength range $\Delta\lambda$.

24. The system of claim 23, wherein said material composition is selected from the group of materials consisting of $SiO_2$, Si, $SiO_xN_y$.

25. The system of claim 22, wherein said material composition of each of said at least two layers is selected to maximize the effect of multiple internal reflections in said complex substrate and in said thin film.

26. The system of claim 22, wherein said physical parameter is selected from the group consisting of thickness t, index of refraction n, extinction coefficient k and energy bandgap $E_g$.

27. The system of claim 22, further comprising a first polarizing means for polarizing said test beam.

28. The system of claim 22, wherein said total optical response comprises a light beam selected from the group consisting of a transmitted beam and a reflected beam, and said apparatus further comprises a second polarizing means positioned in the path of said light beam.

29. A method for optically determining a physical parameter of a thin film, said method comprising the following steps:
   a) providing a test beam;
   b) selecting a wavelength range $\Delta\lambda$ for said test beam;
   c) providing a complex substrate having at least two layers and a non-monotonic and appreciably variable substrate optical response over said wavelength range $\Delta\lambda$, wherein said substrate optical response is measured before said thin film is sandwiched between two of said at least two layers thereby forming a sandwiched structure;
   d) illuminating said sandwiched structure with said test beam to obtain a total response comprising said substrate optical response and an optical response difference due to the presence of said thin film, wherein said complex substrate renders said optical response difference non-zero, non-monotonic and appreciably variable over said wavelength range $\Delta\lambda$; and
   e) determining said physical parameter from said total optical response.

30. The method of claim 29, wherein said substrate optical response is a substrate reflectance, said optical response difference is a reflectance difference due to the presence of said thin film, said total optical response is a total reflectance comprising said substrate reflectance and said reflectance difference, and said illumination step produces a reflected beam.

31. The method of claim 30, further comprising the step of analyzing said reflected beam to determine said physical parameter from at least one Light property selected from the group consisting of s-polarization, p-polarization, s-polarization amplitude, p-polarization amplitude, s-polarization phase, p-polarization phase.

32. The method of claim 30, wherein said reflected beam is analyzed by an ellipsometric technique.

33. The method of claim 30, wherein said step of determining said physical parameter comprises using a dispersion model.

34. The method of claim 33, wherein said dispersion model is the Forouhi-Bloomer model.

35. The method of claim 29, wherein said substrate optical response is a substrate transmittance, said optical response difference is a transmittance difference due to the presence of said thin film said total optical response is a total transmittance comprising said substrate transmittance and said transmittance difference, and said illumination step produces a transmitted beam.

36. The method of claim 35, further comprising the step of analyzing said transmitted beam to determine said physical parameter from at least one light property selected from the group consisting of s-polarization, p-polarization, s-polarization amplitude, p-polarization amplitude, s-polarization phase, p-polarization phase.

37. The method of claim 35, wherein said transmitted beam is analyzed by an ellipsometric technique.

38. The method of claim 35, wherein said step of determining said physical parameter comprises using a dispersion model.

39. The method of claim 38, wherein said dispersion model is the Forouhi-Bloomer dispersion model.

40. The method of claim 29, wherein a structure of said complex substrate is chosen such that said optical response difference is non-zero, non-monotonic and appreciably variable over said wavelength range $\Delta\lambda$.

41. The method of claim 29, wherein said at least two layers are selected to maximize the effect of multiple internal reflections in said complex substrate and in said thin film.

42. The method of claim 29, wherein said physical parameter is selected from the group consisting of thickness t, index of refraction n, extinction coefficient k and energy bandgap $E_g$.

43. An apparatus for optically determining a physical parameter of a thin film, said apparatus comprising:
   a) a complex substrate having at least two layers and a non-monotonic and appreciably variable substrate optical response over a wavelength range $\Delta\lambda$, said complex substrate having said thin film structured between two of said at least two layers;
   b) a light source for illuminating said complex substrate and said thin film with a test beam spanning said wavelength range $\Delta\lambda$;

c) a detector for measuring over said wavelength range $\Delta\lambda$ said substrate optical response and a total optical response comprising said substrate optical response and an optical response difference due to the presence of said thin film, wherein said complex substrate renders said optical response difference non-zero, non-monotonic and appreciably variable over said wavelength range $\Delta\lambda$; and d) a computing unit in communication with said detector for determining said physical parameter from said total optical response.

44. The apparatus of claim 43, wherein a material composition of each of said at least two layers is selected such that said optical response difference is non-zero, non-monotonic and appreciably variable over said wavelength range $\Delta\lambda$.

45. The apparatus of claim 44, wherein said material composition is selected from the group of materials consisting of $SiO_2$, $Si$, $SiO_xN_y$.

46. The apparatus of claim 43, wherein said material composition of each of said at least two layers is selected to maximize the effect of multiple internal reflections in said complex substrate and in said thin film.

47. The apparatus of claim 43, wherein said physical parameter is selected from the group consisting of thickness t, index of refraction n, extinction coefficient k and energy bandgap $E_g$.

48. The apparatus of claim 43, further comprising a first polarizing means for polarizing said test beam.

49. The apparatus of claim 43, wherein said total optical response comprises a light beam selected from the group consisting of a transmitted beam and a reflected beam, and said apparatus further comprises a second polarizing means positioned in the path of said light beam.

50. A system using a monitoring sample for optically monitoring a physical parameter of a thin film, wherein said monitoring sample comprises a complex substrate having at least two layers and a non-monotonic and appreciably variable substrate optical response over a wavelength range $\Delta\lambda$, and wherein said thin film is structured within said complex substrate between two of said at least two layers, said system comprising:

a) a light source for illuminating said complex substrate and said thin film with a test beam spanning said wavelength range $\Delta\lambda$;

b) a detector for measuring over said wavelength range $\Delta\lambda$ said substrate optical response and a total optical response comprising said substrate optical response and an optical response difference due to the presence of said thin film, wherein said complex substrate renders said optical response difference non-zero, non-monotonic and appreciably variable over said wavelength range $\Delta\lambda$; and c) a computing unit in communication with said detector for determining said physical parameter from said total optical response.

51. The system of claim 50, wherein a material composition of each of said at least two layers is selected such that said optical response difference is non-zero, non-monotonic and appreciably variable over said wavelength range $\Delta\lambda$.

52. The system of claim 51, wherein said material composition is selected from the group of materials consisting of $SiO_2$, $Si$, $SiO_xN_y$.

53. The system of claim 50, wherein said material composition of each of said at least two layers is selected to maximize the effect of multiple internal reflections in said complex substrate and in said thin film.

54. The system of claim 50, wherein said physical parameter is selected from the group consisting of thickness t, index of refraction n, extinction coefficient k and energy bandgap $E_g$.

55. The system of claim 50, further comprising a first polarizing means for polarizing said test beam.

56. The system of claim 50, wherein said total optical response comprises a light beam selected from the group consisting of a transmitted beam and a reflected beam, and said apparatus further comprises a second polarizing means positioned in the path of said light beam.

* * * * *